US006748294B1

(12) United States Patent
Overman et al.

(10) Patent No.: US 6,748,294 B1
(45) Date of Patent: Jun. 8, 2004

(54) FLATS BUNDLE COLLATOR

(75) Inventors: John Overman, Evanston, IL (US); George Rabindran, Davie, FL (US); Steve Archer, Des Plaines, IL (US); Dan Rice, deceased, late of Buffalo Grove, IL (US), by Sherrie Rice, legal representative; Tom Wells, Crystal Lake, IL (US); Ken Guenther, Antioch, IL (US)

(73) Assignee: Bowe Bell + Howell Postal Systems Company, Lincolnwood, IL (US)

( * ) Notice: Subject to any disclaimer, the term of this patent is extended or adjusted under 35 U.S.C. 154(b) by 0 days.

(21) Appl. No.: 09/694,403

(22) Filed: Oct. 23, 2000

(51) Int. Cl.[7] .................................................. G06F 7/00

(52) U.S. Cl. ....................... 700/224; 700/225; 700/226; 414/796.5; 414/796.7; 414/796.9; 414/797; 270/52.02; 270/52.04

(58) Field of Search ................................ 700/213, 225, 700/226, 223, 224; 414/795.4, 796.5, 796.7, 796.9, 797; 270/52.01, 52.02, 52.04; 209/584, 900, 905

(56) References Cited

U.S. PATENT DOCUMENTS 3,063,578 A * 11/1962 Millar ..................... 414/796.7
3,780,884 A * 12/1973 Jones ......................... 414/793
5,143,225 A * 9/1992 Rabindran et al. .......... 209/584
6,062,807 A * 5/2000 Johnson et al. .......... 414/795.8

* cited by examiner

*Primary Examiner*—Khoi H. Tran
(74) *Attorney, Agent, or Firm*—McDermott, Will & Emery

(57) ABSTRACT

The present invention relates to an apparatus for collating a plurality of separate groups or bundles of similar flats mailpieces arranged in a predetermined delivery point sequence, each mailpiece imprinted with a distinct delivery point or address indicia, to produce a single stream of mailpieces in new groups, where each new group comprises a plurality of mailpieces all addressed to a distinct delivery point. The apparatus comprises a plurality of feed units, each unit configured to process a quantity of similar mailpieces, each with a distinct delivery point indicia on the face of the mailpiece, and to deposit each mailpiece in a distinct pocket on a collation conveyor which traverses all of the plurality of feed units. Each pocket will ultimately contain different mail pieces, all addressed to the same delivery point. Multiple new groups of mailpieces are then automatically placed in containers in a sequence corresponding to a predetermined delivery route.

30 Claims, 25 Drawing Sheets

Fig. 16A
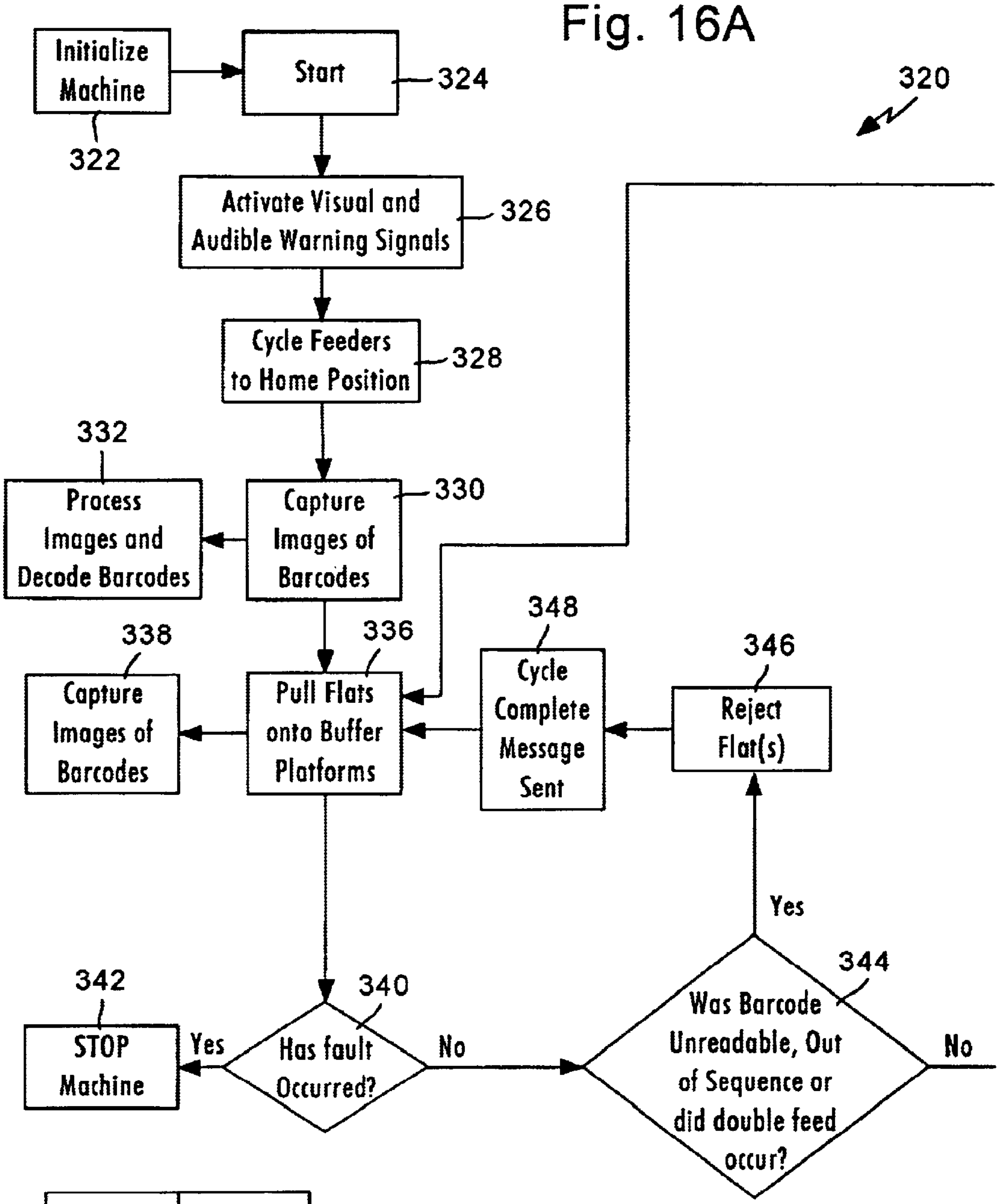
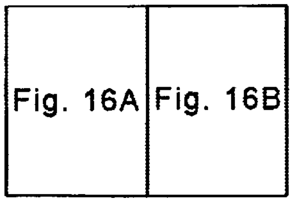
Fig. 16

FLATS BUNDLE COLLATOR

The present invention relates to a flats bundle collator, and particularly to a collator apparatus that will merge separate groups of pre-addressed, similar mail documents imprinted with a POSTNET barcode or delivery point indicia into a stream of mail document groups that are consistently ordered in delivery point sequence, where each document group is to be delivered to a distinct delivery point in sequence along a mail delivery route.

BACKGROUND OF THE INVENTION

The Postal Service is constantly working towards increasing the speed and efficiency in delivering mail. To this end, the processing of mail is increasingly being performed by automatically controlled and operated machinery, which sorts mail in accordance with its ultimate destination for ease and efficiency of delivery to a specific delivery point along a mail carrier's route.

As part of the automation and efficient delivery of the mail, sorter machines have been developed that sort regular mailpieces in a sequence corresponding to the delivery point route used by the mailperson for delivery to individual addresses. An example of a carrier sequence bar code sorter is disclosed in U.S. Pat. No. 5,143,225. However, these machines cannot sort the larger, odd shaped and non-uniform rigid flat mailpieces described below.

Present mail handling systems are designed to process regular mail and/or flat mail, the latter being defined as FSM 881 automation mail in the Domestic Mail Manual. Flat mail ranges from four to fifteen and three-quarters inches in length, from four to twelve inches in width, and from 0.007 to 1.25 inches thick, weighing from 0.01 to 6 pounds. The types of mail in the flat category include, but are not limited to: catalogs, magazines (with or without sleeves or polywrap), newspapers, padded envelopes, single sheet flyers, and compact disks. Currently, there are no known prior art machines that perform sequencing of such flats mail.

A large quantity of flat mail today comprises mass mailings, which may include several thousand or more magazines, catalogs and the like which are delivered to Postal sorting facilities in bundles, each piece within the bundle organized in delivery point sequence, primarily according to an eleven digit POSTNET delivery point designation, with each mailpiece imprinted with a POSTNET barcode representing the delivery point of the mailpiece. The first five digits of the POSTNET barcode identify the post office servicing the area encompassing the designated delivery point, the second four digits identify a zone within the area serviced by the designated post office, and the last two digits identify the distinct delivery point, such as an individual home or an apartment unit in a building, etc. Each bundle of similar mailpieces is prepared by a magazine or catalog publisher, or other mass mailing house, in delivery point sequence according to a POSTNET designation, and then delivered to a postal facility for sortation and further processing. It should be understood however that not all bundles or mailings are comprised of sequenced mailpieces.

Prior to the present invention, such flat mail was sorted by hand by postal employees, and placed in bundles according to delivery points along a mail delivery route. This manual sortation is time consuming and highly labor intensive. Therefore, an apparatus was considered that would automatically receive many bundles of mail documents, each bundle composed of similar pieces of mail organized by delivery point sequence, which apparatus would merge the documents in each bundle into a discrete new document group, where each new individual group includes mail documents designated for delivery to a single delivery point. Regular mailpieces addressed to the same delivery point are added to each new individual group and the combined mailpieces are placed in a pocket or container in a sequence corresponding to the selected delivery route. The apparatus under consideration would also be capable of adding non-barcoded mail documents to each document group, in a mailing where every delivery point address along a route receives a particular piece of mail.

Therefore, it is an object of the present invention to automate the collation of flat mailpieces, each imprinted with a POSTNET barcode or other delivery point indicia, which mailpieces are received from the publisher of the mailpiece in a delivery point sequence or non-barcoded mailings where every delivery point address along a route receives a particular piece of mail, into a single stream of new document groups and which mailpieces are merged that are consistently oriented and in delivery point sequence for delivery of each new group to a designated delivery point address.

A further object of the present invention is to provide a collator apparatus that permits the rapid feeding of large volumes of bundles of both pre-sequenced and non-barcoded similar flat mailpieces into a sortation system that creates new individual groups of dissimilar mailpieces for delivery of each new group to a single delivery point.

Another object of the present invention is to provide a collator apparatus that captures the image of a delivery point indicia on each piece of flat mail processed by the collator, and transmits that delivery point data to a data processing unit for operational control of the collator.

A further object of the present invention is to provide a flat mailpiece collator comprising multiple feed stations and which can be operated by one person.

Yet another object of the present invention is to provide a document unloading device that rapidly and firmly grips an individual mailpiece in a stack of mailpieces, and transfers the mailpiece for deposit onto a new group of mailpieces addressed to the same delivery point.

Another object of the present invention is to provide a system for rejecting mailpieces which include a delivery point indicia which cannot be read by the image capture device, or which are out of sequence in the original stack of mailpieces.

A further object of the present invention is to provide an apparatus for retaining a mailpiece on a buffer platform until a new group of mailpieces bearing the same delivery point indicia and/or collated to the same delivery point, is advanced by a collation conveyor to a position beneath the buffer platform.

Still another object of the present invention is to provide a collator for merging separate groups of delivery point sequenced mailpieces into a single stream of new mailpiece bundles that are consistently oriented in delivery point sequence, and which collator incorporates a first data processing unit for controlling the collator operation, and a second data processing unit which is used off-line from the collator for software and U.S. Postal Service data network interface development.

A further object of the present invention is to provide an apparatus for merging separate groups of delivery point sequenced bundled flat mailpieces into a single stream of mailpieces that are consistently oriented in individual new bundles for each delivery point, which apparatus includes a plurality of individual document feed units processing the mailpieces and depositing the mailpieces on a single moveable conveyor system which includes a plurality of pockets, each pocket representing a different and distinct delivery point.

Another object of the present invention is the provision of an automatic unloader for depositing multiple new groups of consistent delivery point addressed mailpieces from a conveyor into containers, where the new groups of mailpieces are arranged in an order corresponding to the sequence of delivery over a predetermined delivery route.

SUMMARY OF THE INVENTION

The present invention relates to an apparatus for collating a plurality of separate groups or bundles of similar mailpieces arranged in a predetermined delivery point sequence, each mailpiece imprinted with a distinct delivery point or address indicia, to provide a single stream of mailpieces in new groups, where each new group comprises a plurality of mailpieces all addressed to a distinct delivery point. The apparatus comprises a plurality of feed units, each unit configured to process a quantity of similar mailpieces, each with a distinct delivery point indicia on the face of the mailpiece, and to deposit each mailpiece in a distinct pocket on a collation conveyor which traverses all of the plurality of feed units. Each pocket will ultimately contain different mail pieces, all addressed to the same delivery point. Multiple new groups of mailpieces are then automatically placed in containers in a sequence corresponding to a predetermined delivery route.

Each feed unit comprises two independently vertically and horizontally moveable document platforms that rapidly and continuously advance large quantities of delivery point sequenced and imprinted mailpieces or documents in a stack to a feed station. An image capture camera obtains the digital image of the delivery point indicia on the topmost mailpiece of the stack, and transmits the data from the image to a data processing unit which controls the operation of each individual feed unit, the operations of the collation conveyor which traverses all of the individual feed units and receives mailpieces from each feed unit, and the operation of the automatic traying apparatus which places delivery point consistent groups of mailpieces in containers corresponding to a predetermined delivery route sequence.

After the image capture camera has captured the digital image of the delivery point indicia on the topmost mailpiece, a suction and gripper mechanism at the feed station of each collator unit engages and removes the topmost mailpiece in each stack of mailpieces advanced to the feed station, and moves the topmost mailpiece to a moveable buffer platform disposed over the collation conveyor. The suction and gripper mechanisms then return to a home position to be ready to engage and remove the next topmost mailpiece. If the data processing unit detects a match between the delivery point of the mailpiece on the buffer platform and the delivery point designation of the collation conveyor pocket directly below the buffer platform, the buffer platform is moved out from beneath the mailpiece on the buffer platform to deposit the mailpiece in the designated pocket on the collation conveyor. If the data processing unit does not detect a match between the delivery point of the mailpiece and the delivery point designation of the collation conveyor pocket directly below the buffer platform, the buffer platform remains in place and the mailpiece is not deposited onto the collation conveyor until a match, as described herein, is sensed upon lateral movement of the collation conveyor across each of the individual feed units.

The buffer platform is capable of movement from a first position over the collation conveyor to a second position over a reject conveyor or platform. If the image capture camera cannot read the POSTNET barcode on a particular mailpiece, or the mailpiece is deemed by the data processing unit to be out of sequence, that mailpiece is retained on the buffer platform as the buffer platform moves to its second position over the reject conveyor or platform. The mailpiece is then retained in place while the buffer platform moves out from under the mailpiece and back to its home position, and the mailpiece is deposited on the reject conveyor or platform. Rejected mailpieces are then manually added to the appropriate bundle of similarly addressed mailpieces.

A retractable finger assembly is adapted to ride in corresponding grooves in the buffer platform, and engages either the leading edge or trailing edge of the mailpiece when the data processing unit commands the collator to retain the document on the buffer platform as the buffer platform moves out from under a mailpiece. The finger assembly is also retractable away from the buffer platform to allow a mailpiece to remain on the buffer platform as the platform is moved from its position above the collation conveyor to its position over the reject conveyor.

The collation conveyor of the present invention comprises an endless belt extending in a continuous run past each of the plurality of feed units. Substantially vertically extending fingers disposed on the collation conveyor belt define sequenced pockets on the conveyor, each pocket identified in the data processing unit with a distinct delivery point address. Therefore, as each pocket of the collation conveyor arrives at the end of the conveyor belt run, each pocket contains a group of dissimilar mailpieces all collated to the same delivery point. The groups are then automatically placed in containers for delivery pursuant to a predetermined route sequence.

At the end of the collation conveyor, which now supports a new group of mailpieces in individual pockets, each pocket comprising mailpieces for one designated delivery point address, a system is provided to load each new group into containers in a sequence corresponding to a predetermined delivery route.

DETAIL DESCRIPTION OF THE DRAWINGS

A fuller understanding of the foregoing may be had by reference to the accompanying drawings wherein.

Figure 4:
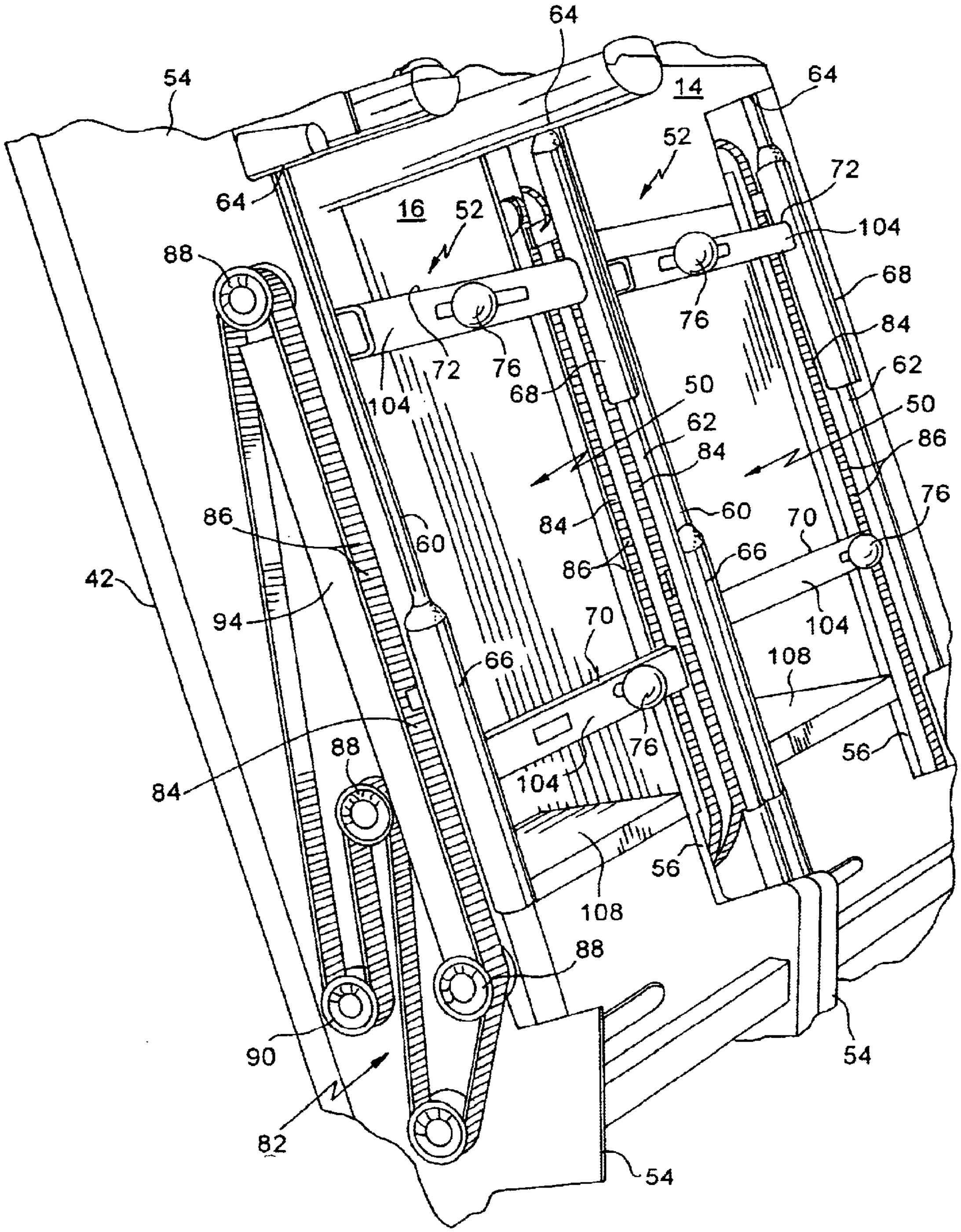
FIG. 4 is a front perspective view of the feed stack support paddles and stack support paddle mounting shafts and drive belts for the stack support paddles forming part of the present invention.
Figure 4A:
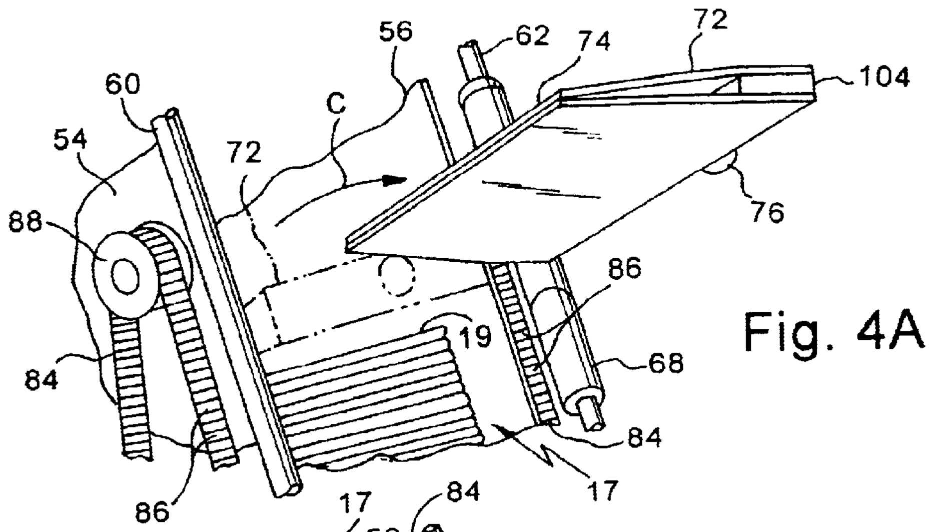
Figure 4B:
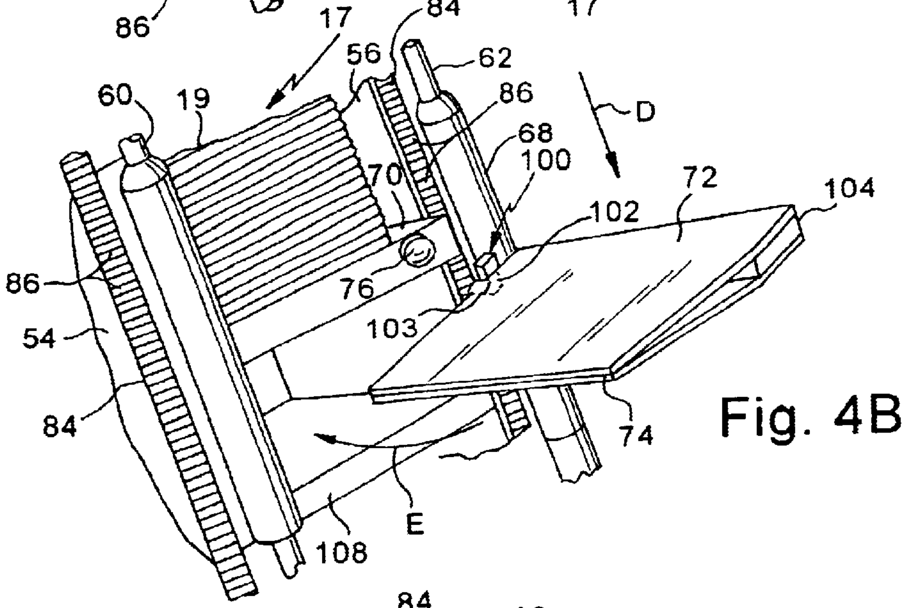
Figure 4C:
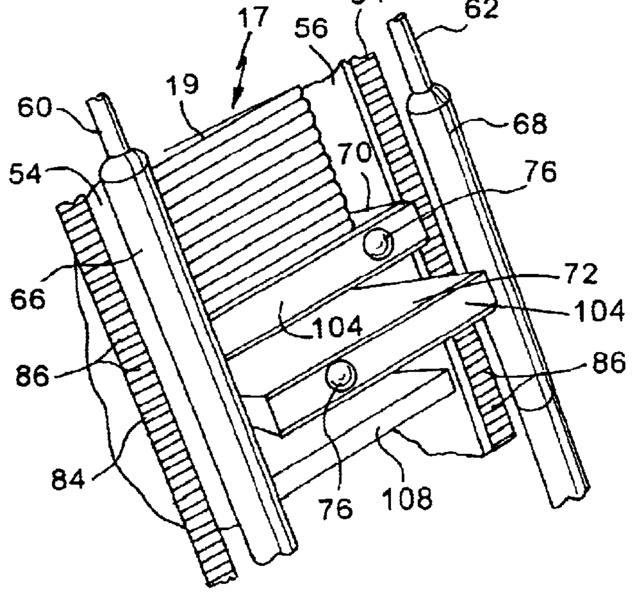
Figure 5:
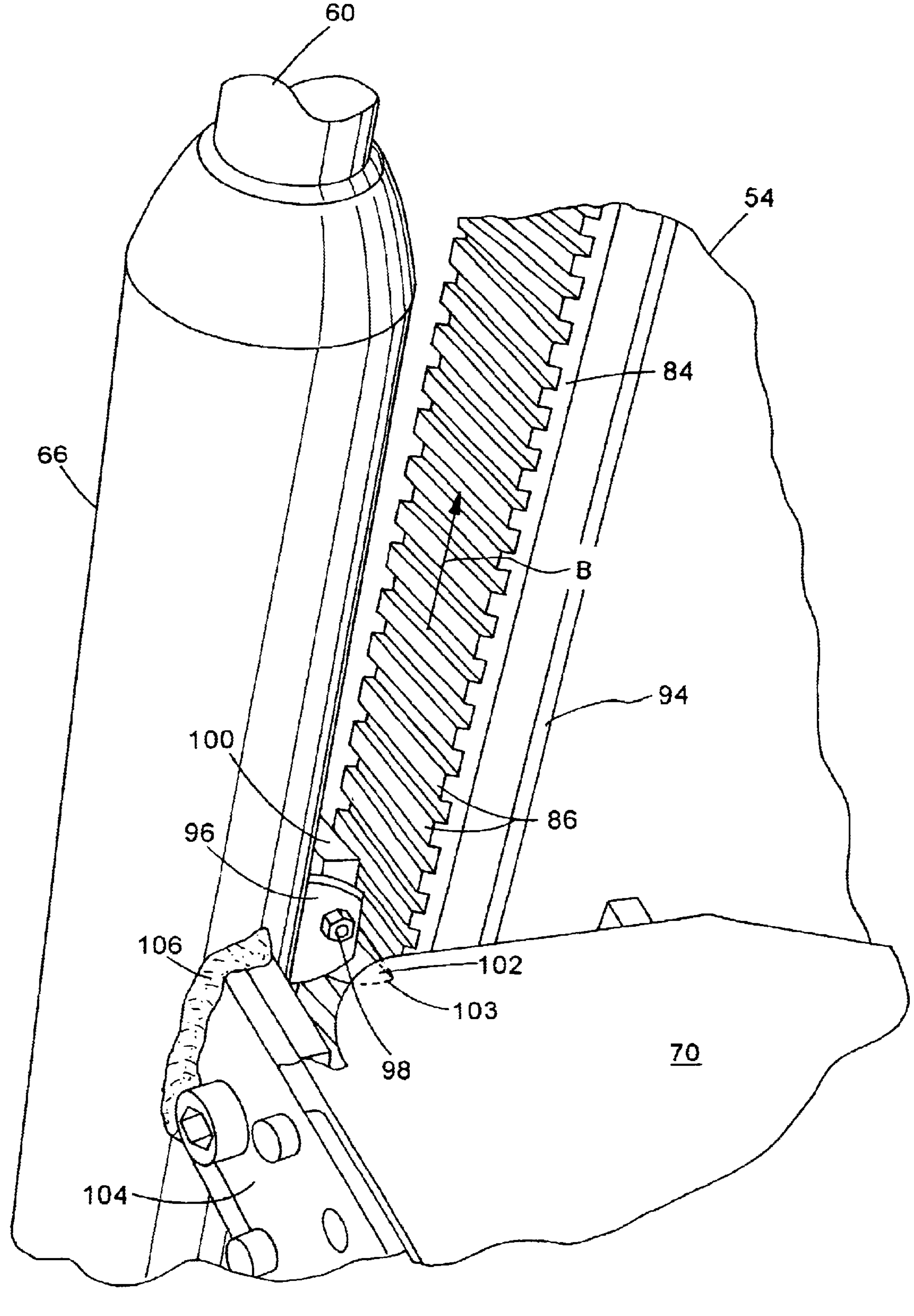
Figure 6:
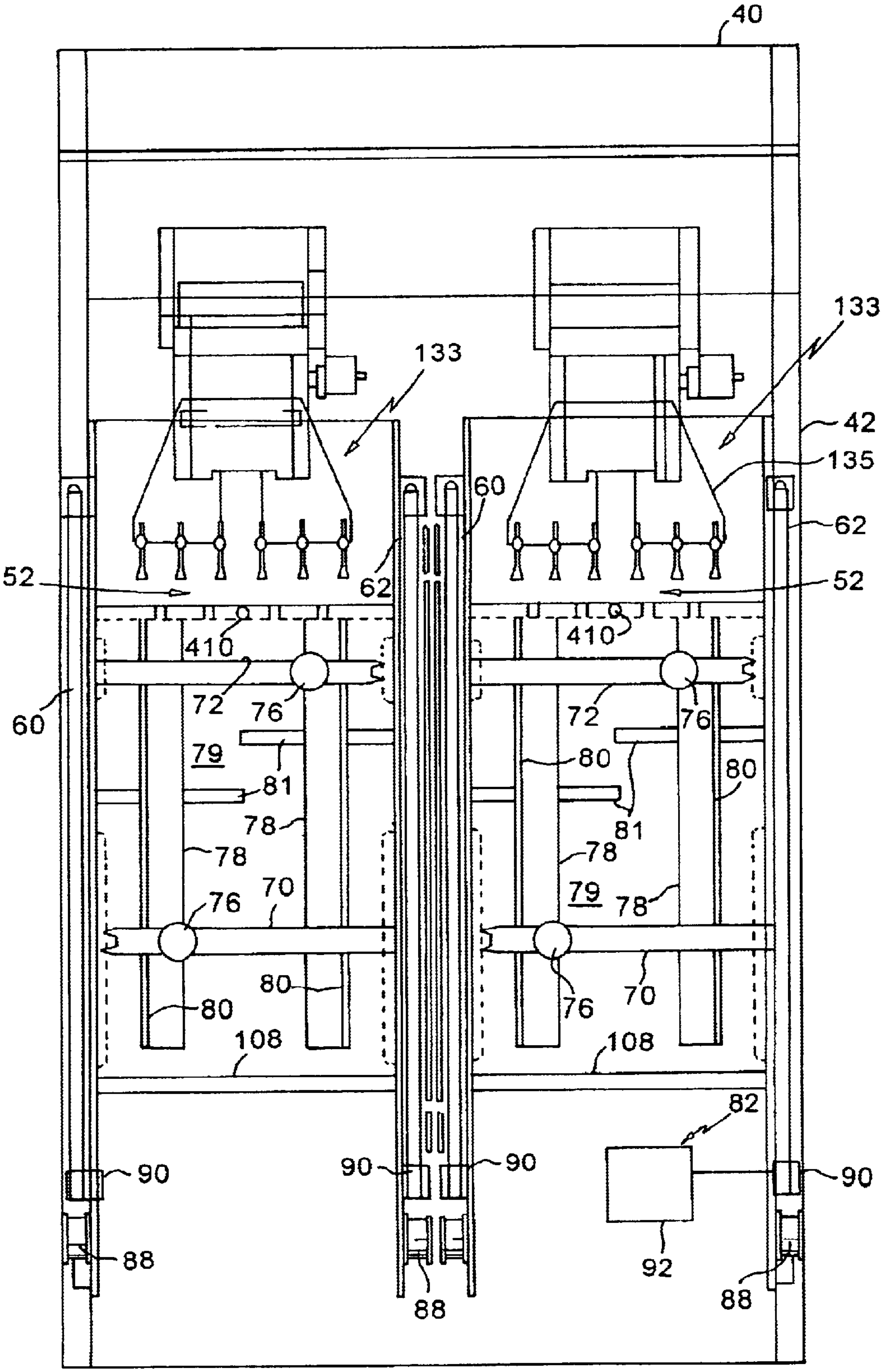
Figure 7:
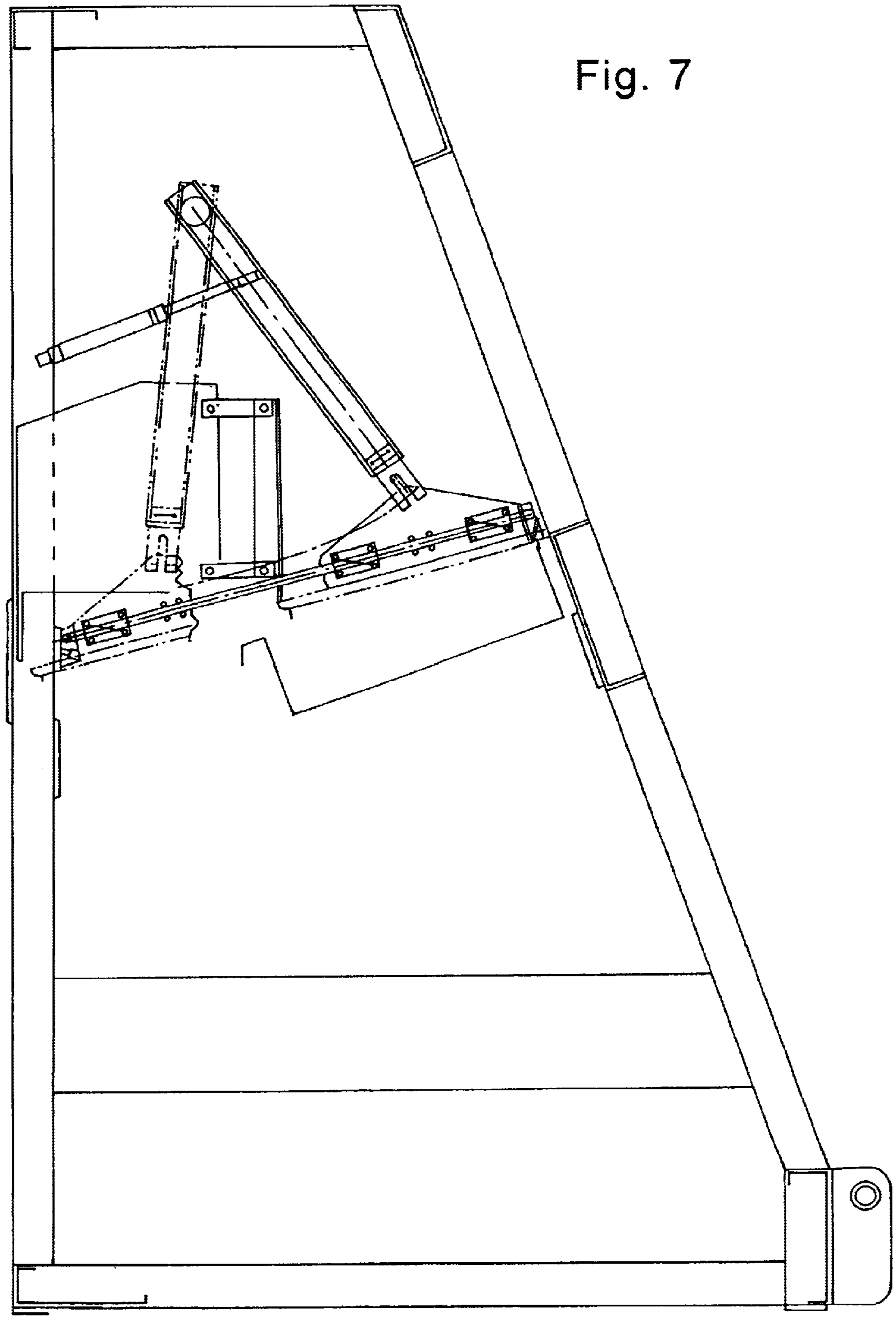
Figure 8:
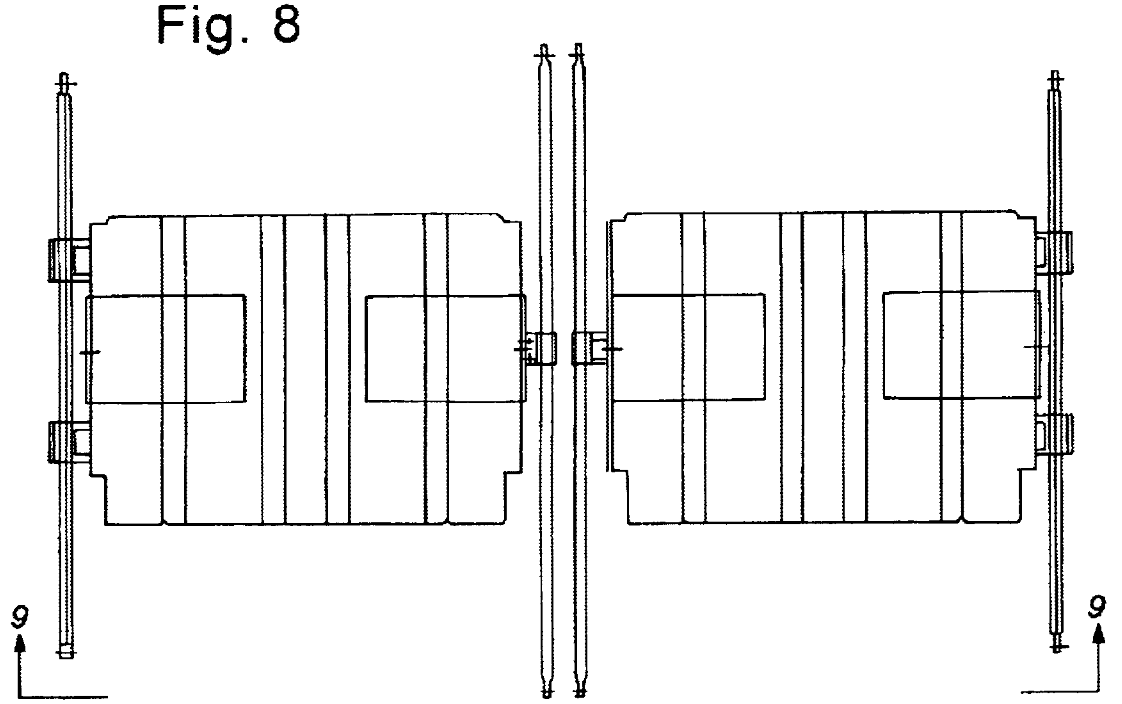
Figure 9:
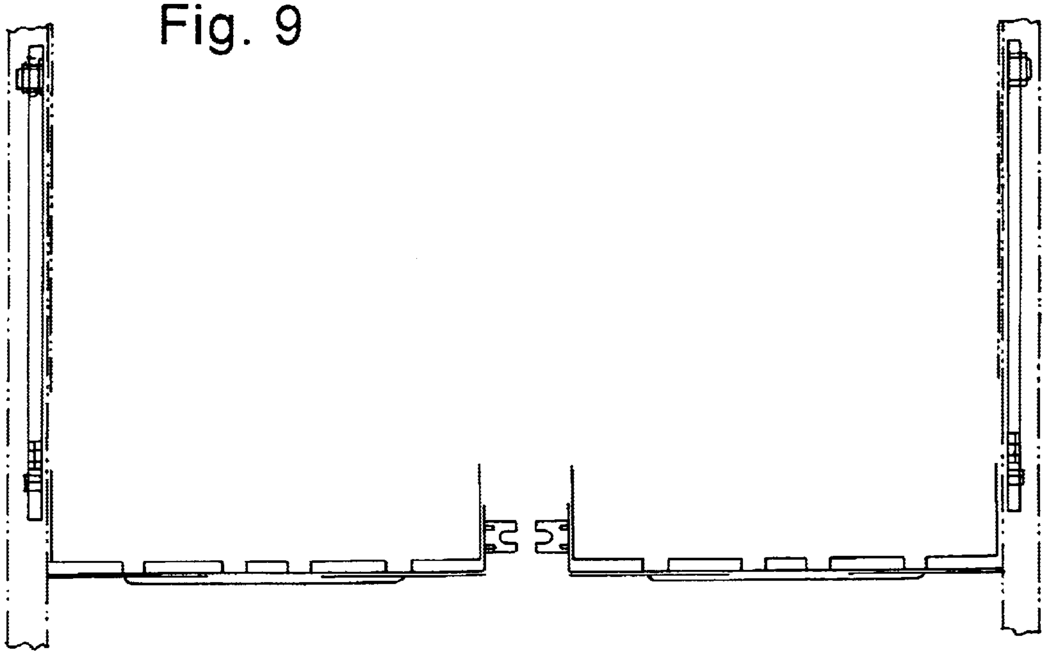
Figure 9A:
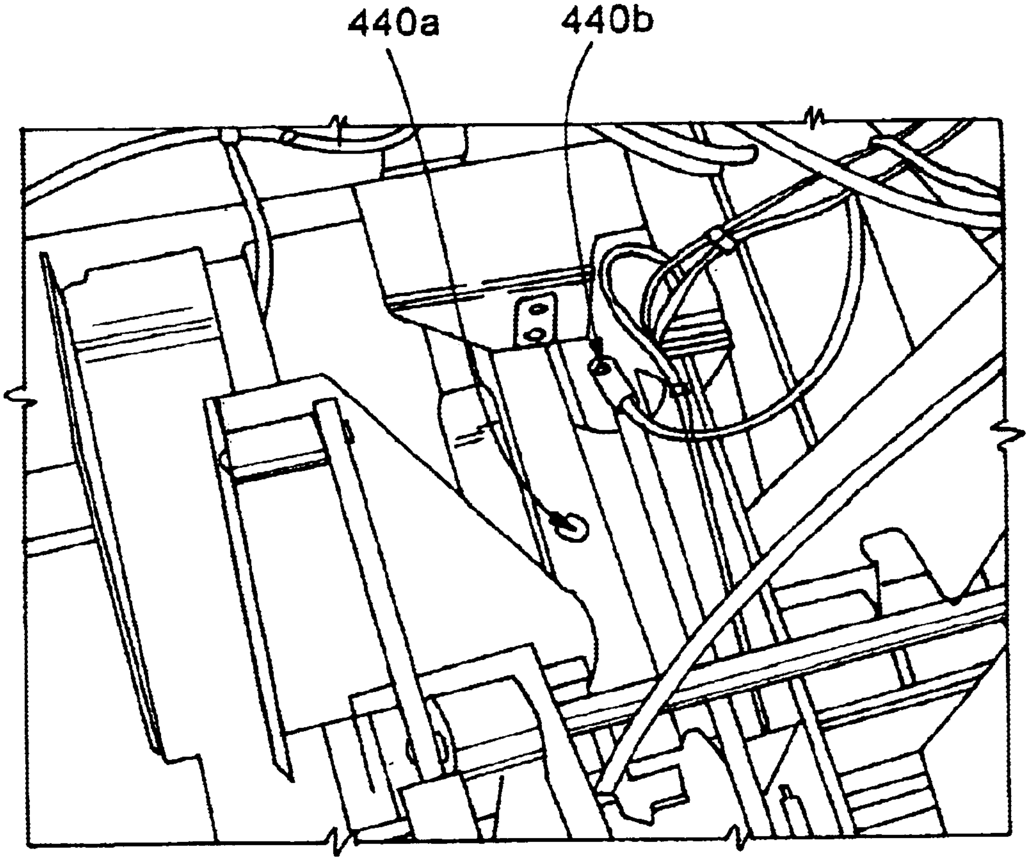

FIGS. 4A, 4B and 4C are schematic perspective views of the pivotal and vertical movement of the stack support paddles of the present invention, showing in FIG. 4B the latch on the support paddle which engages the drive belt (FIG. 4C) which elevates the support paddles and controllably drives the support paddles in an upward direction, and showing the movement of an empty support paddle to a new position beneath a full support paddle, whereby the lower support paddle is positioned to accept a new stack of documents;

FIG. 5 is a detail perspective view showing the unidirectional and pivotally detachable mounting between the stack support paddles and the paddle drive belt of the present invention;

FIG. 6 is a detail front elevation view of one feeder module mechanism of the flats bundle collator forming the present invention, showing the document picker assembly and stack support paddles, and their respective mounting elements;

FIG. 7 is a detail partial side elevation view of the flats bundle collator comprising the present invention showing the two end positions of the buffer platform;

FIG. 8 is a top plan view of two buffer platforms in a single feed station of the collator of the present invention;

FIG. 9 is a front elevation view of the two buffer platforms in each feed station of the collator of the present invention;

FIG. 9A is a perspective view of a buffer plate sensor as an alternative embodiment to the gripper jaw sensor of the present invention.

Figure 1:
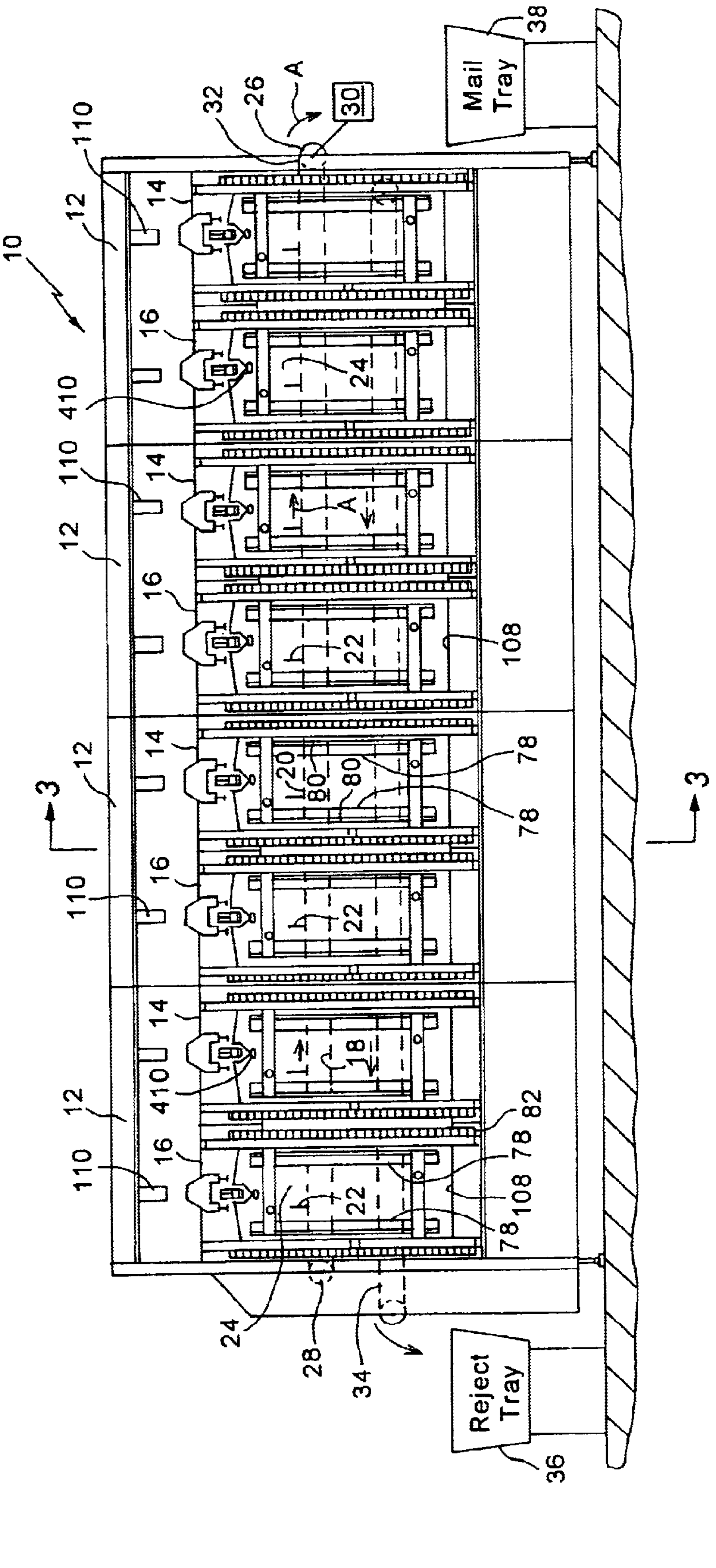
FIG. 1 is an elevation view of a multi-station flats bundle collator constructed in accordance with the present invention.
Figure 10:
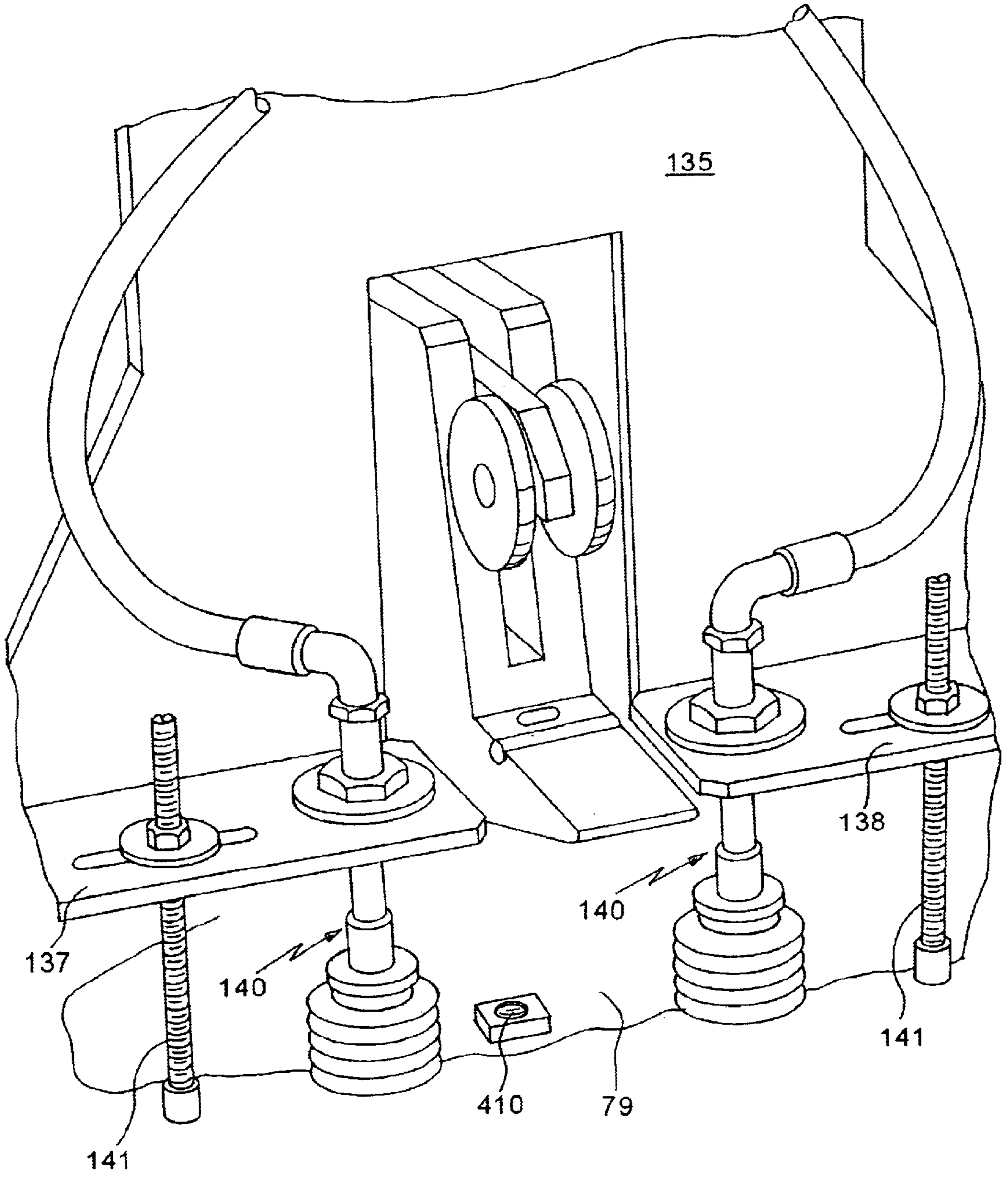
Figure 11:
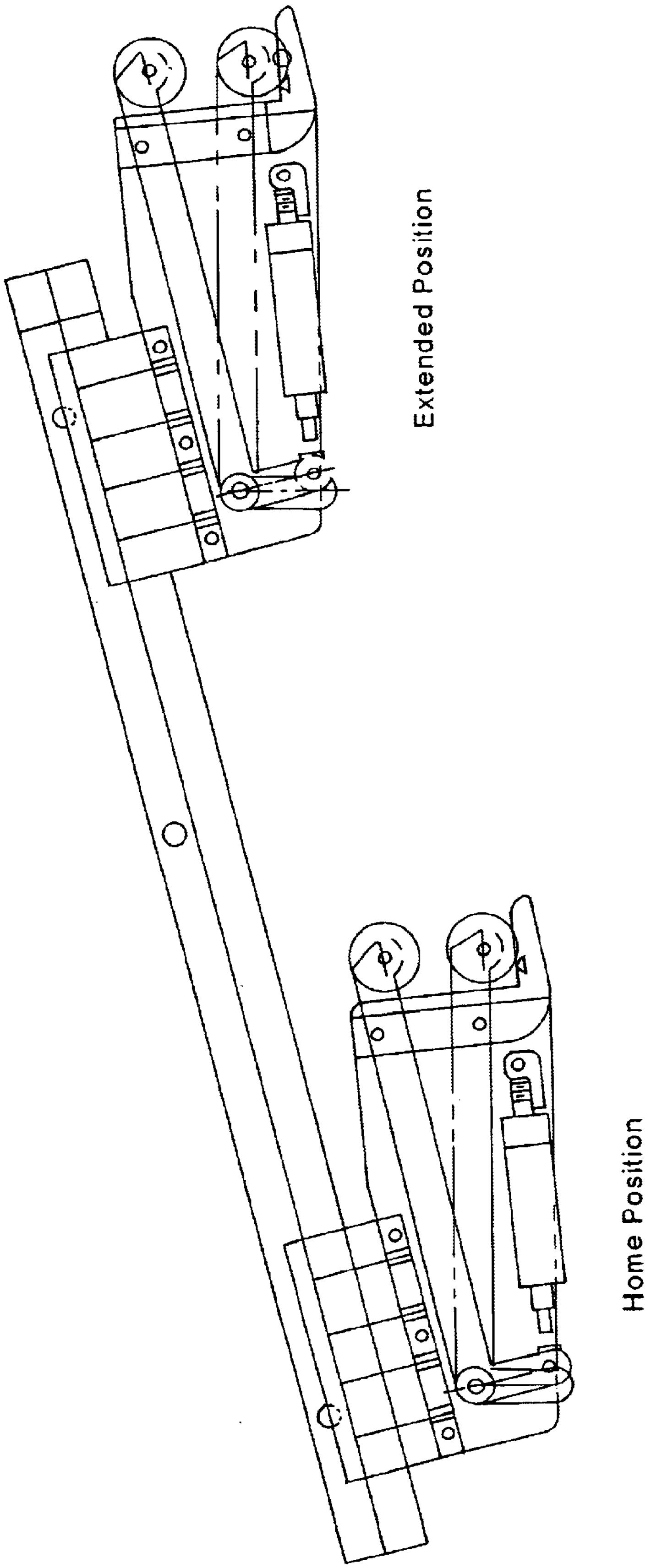
Figure 12:
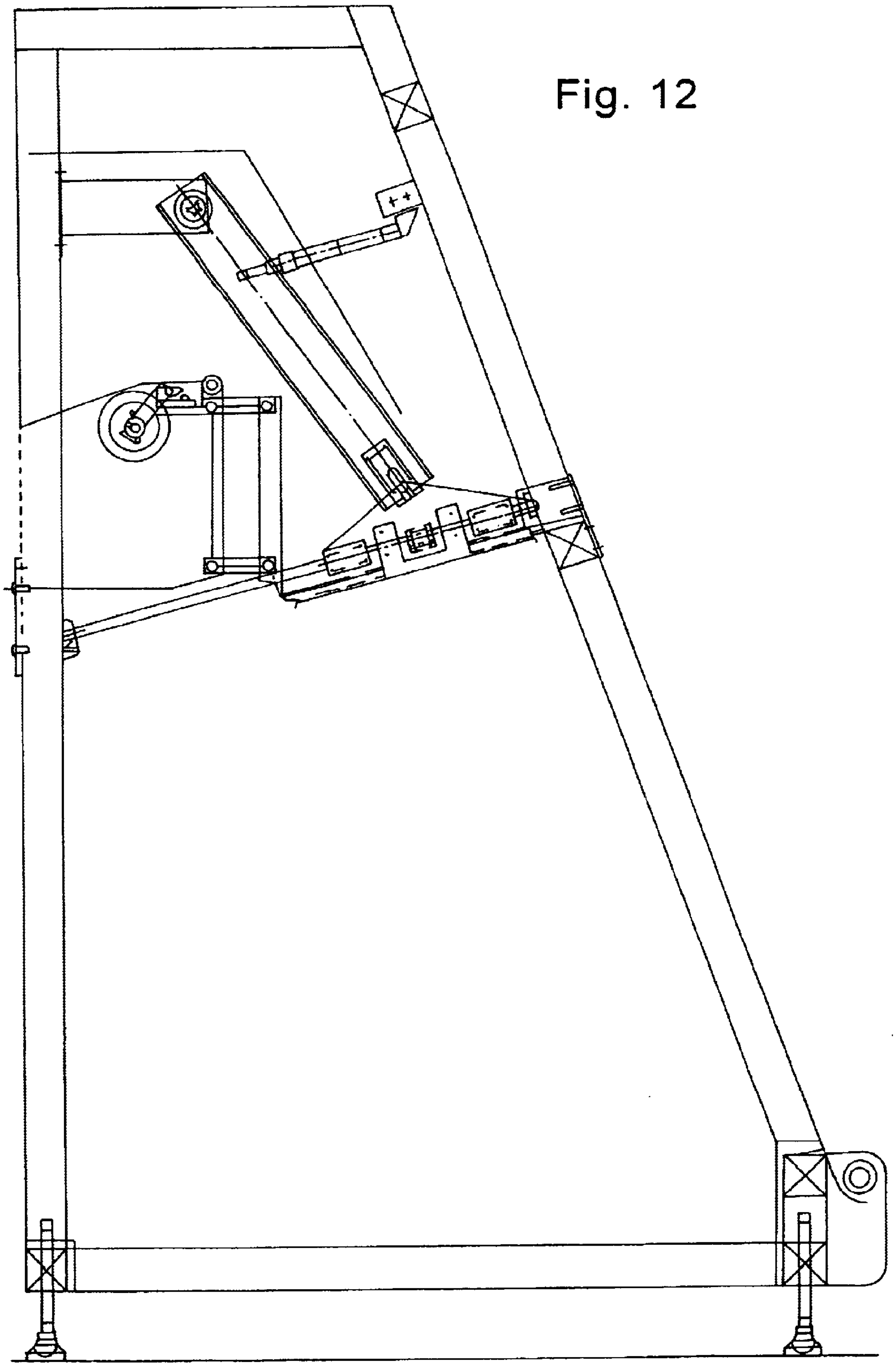
Figure 13:
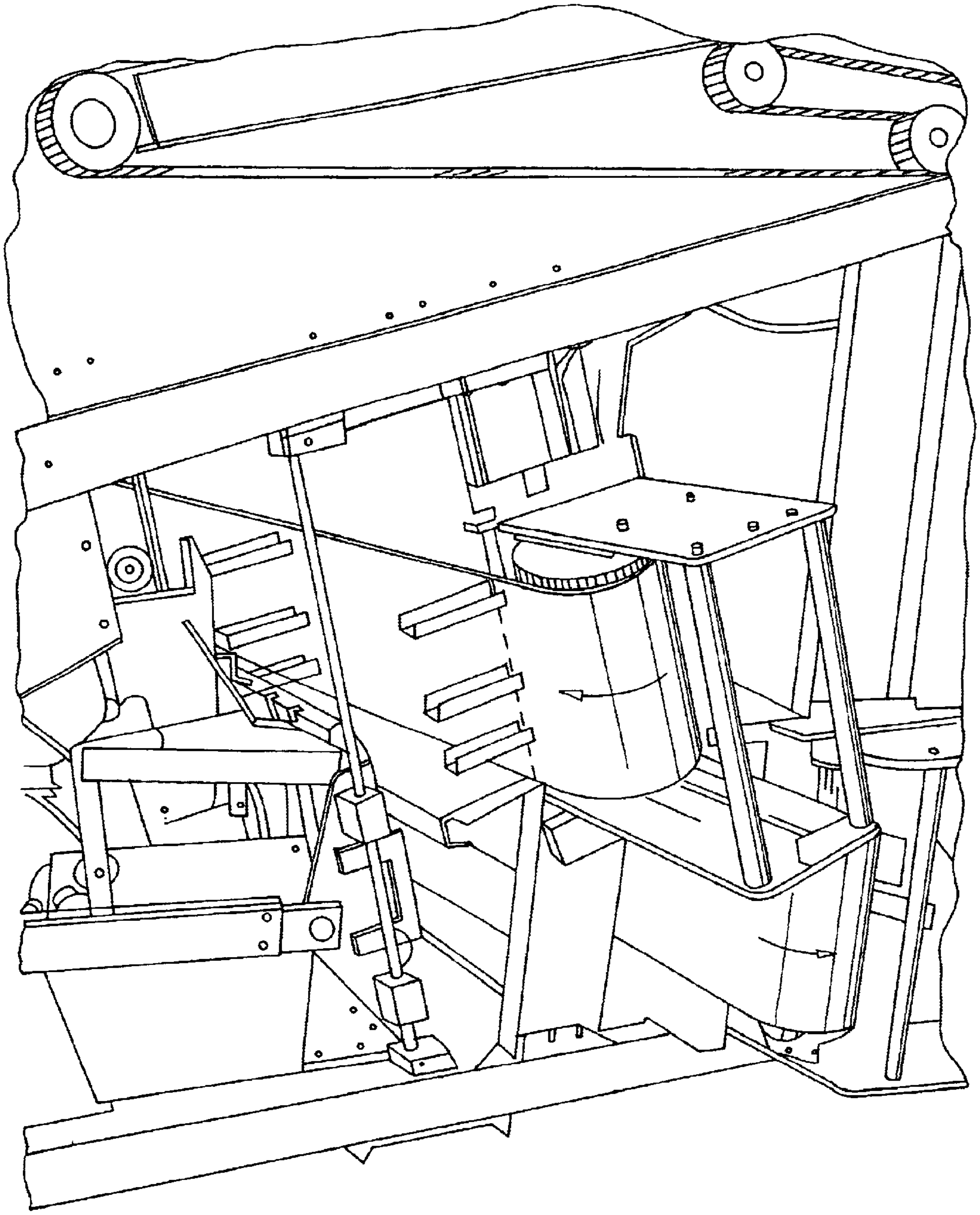
Figure 14C:
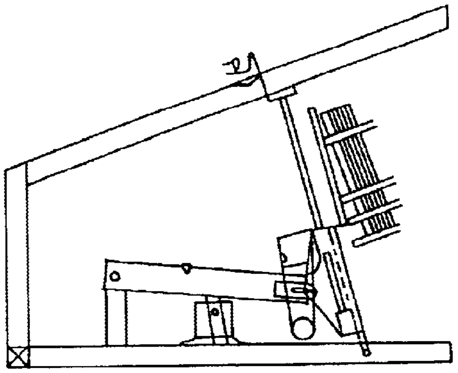
Figure 14F:
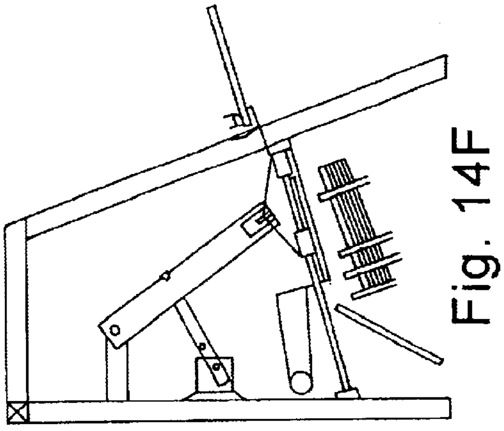
Figure 14B:
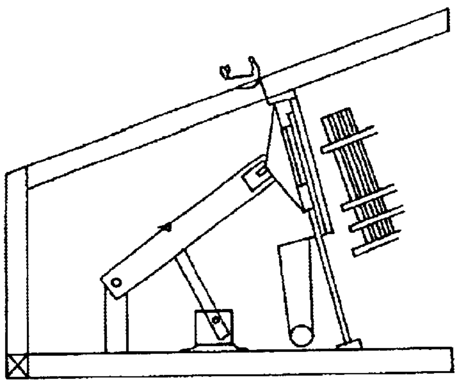
Figure 14E:
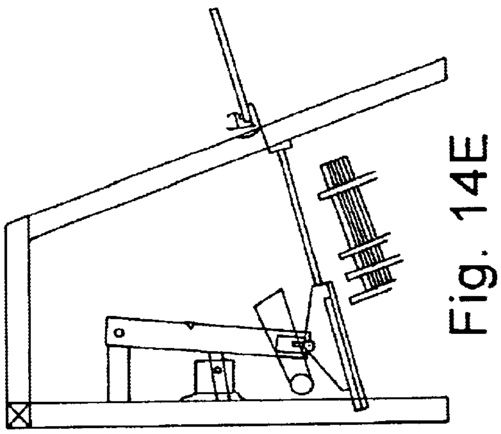
Figure 14A:
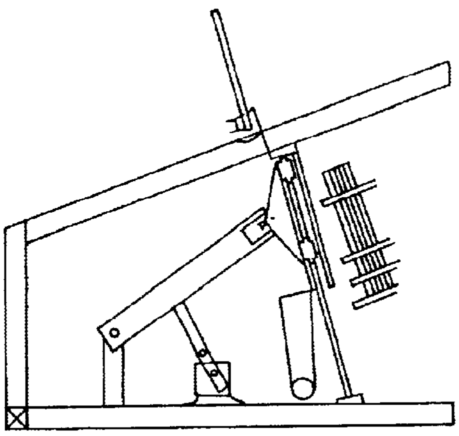
Figure 14D:
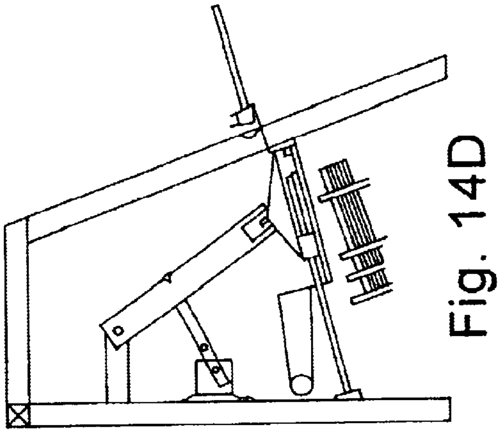
Figure 15:
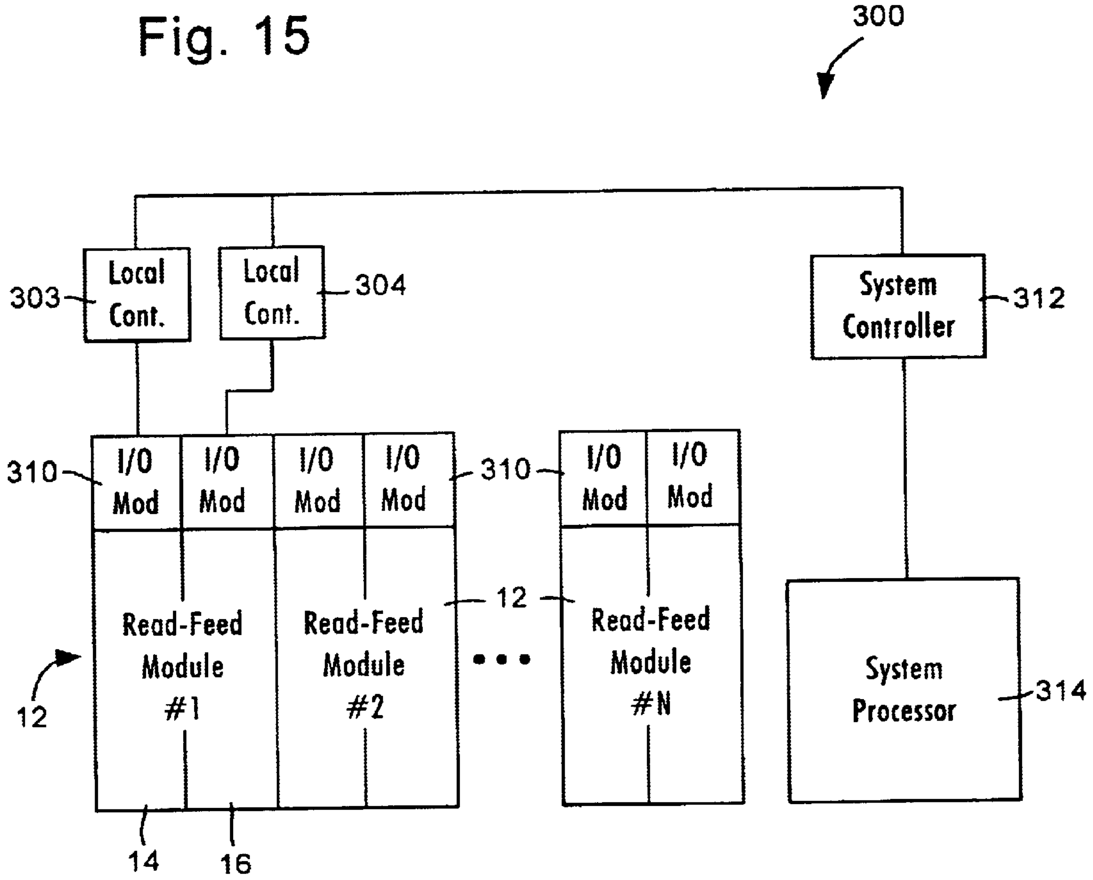
Figure 16B:
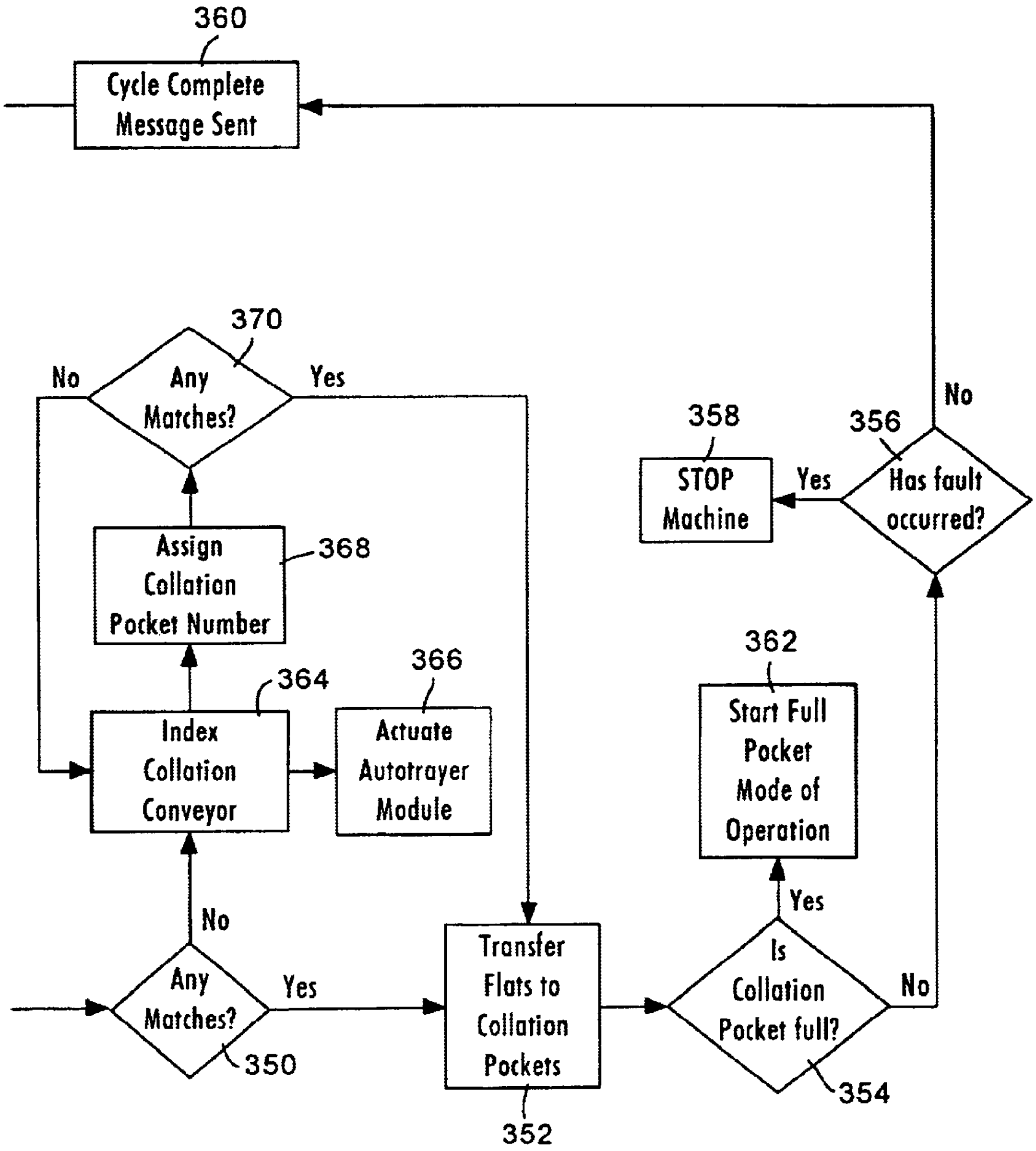
Figure 17:
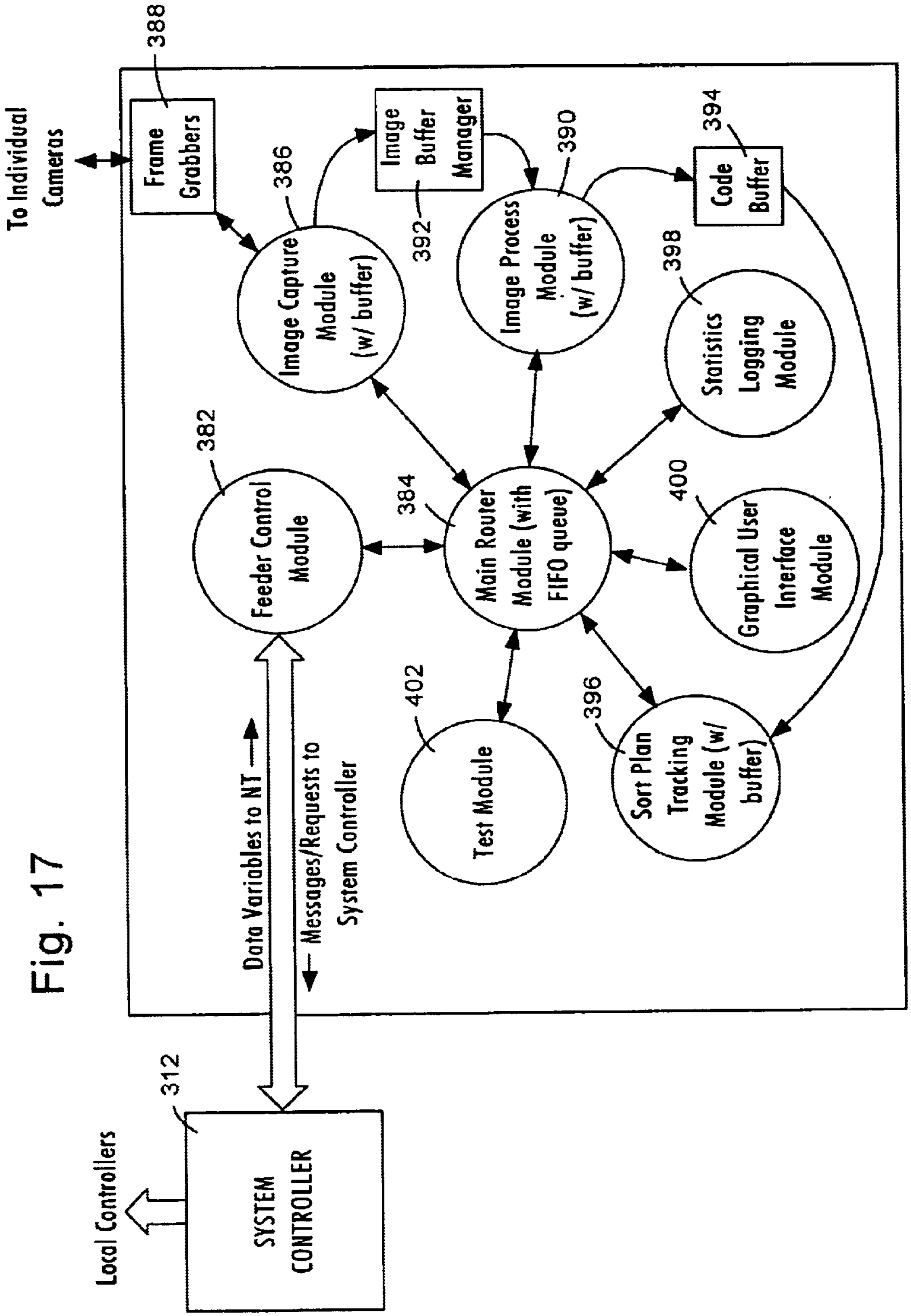
Figure 18:
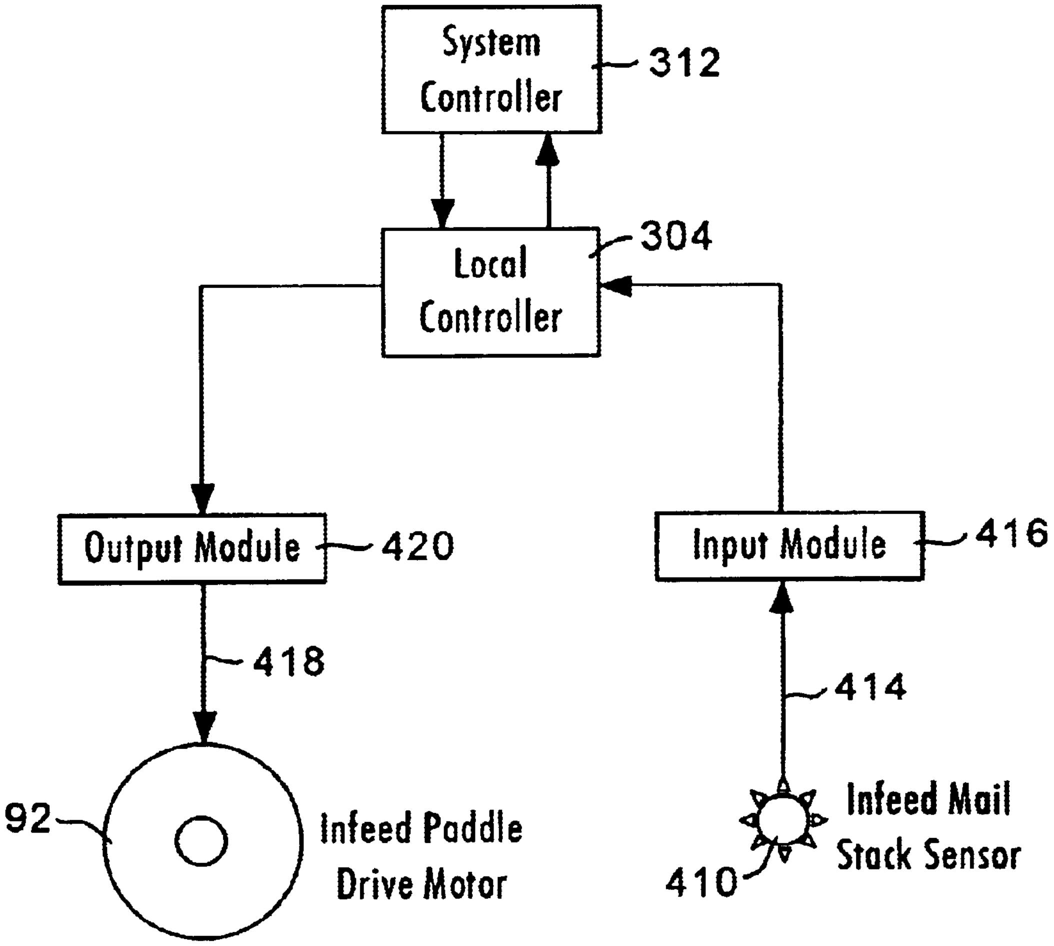
Figure 19:
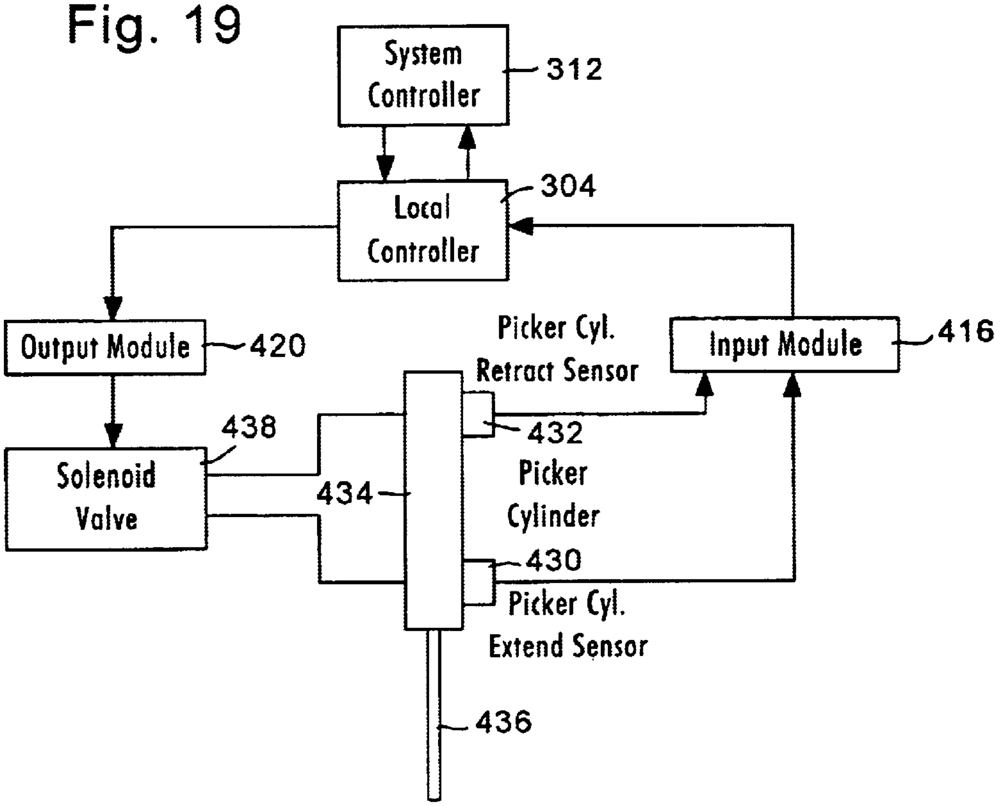
Figure 20:
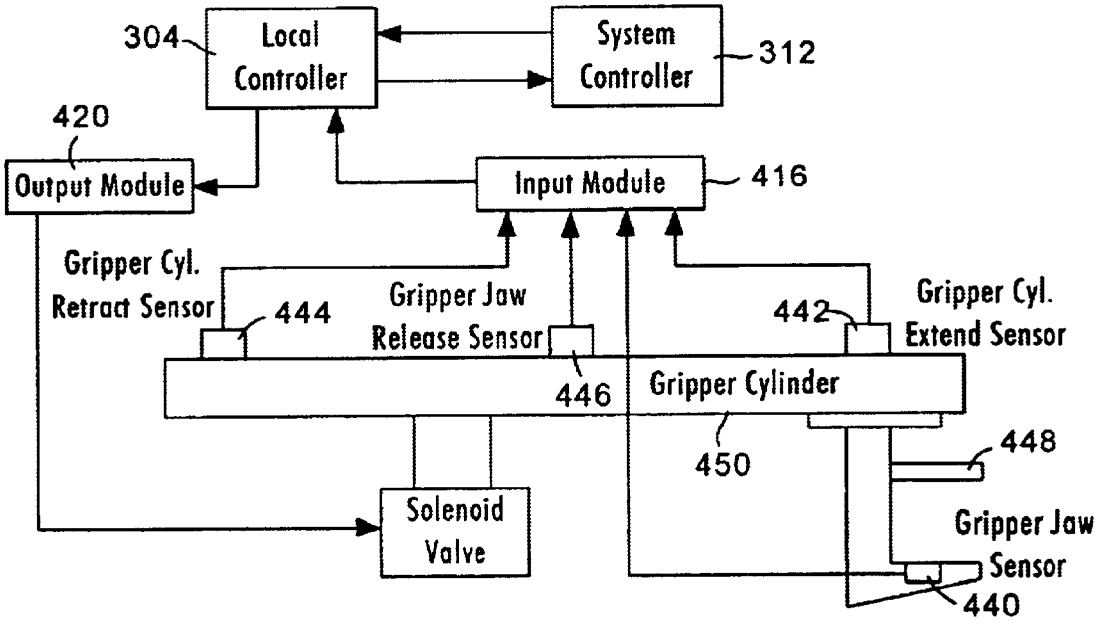
Figure 21:
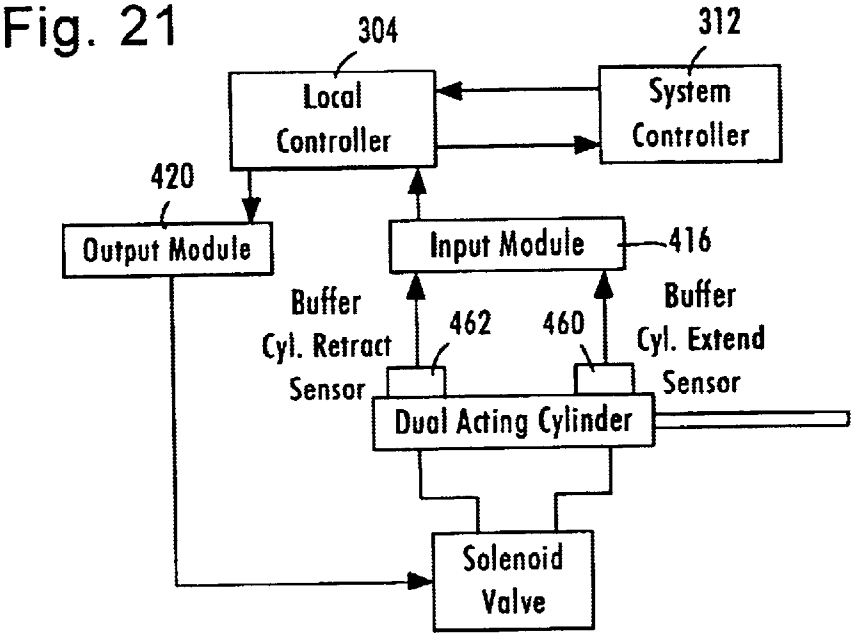
Figure 22:
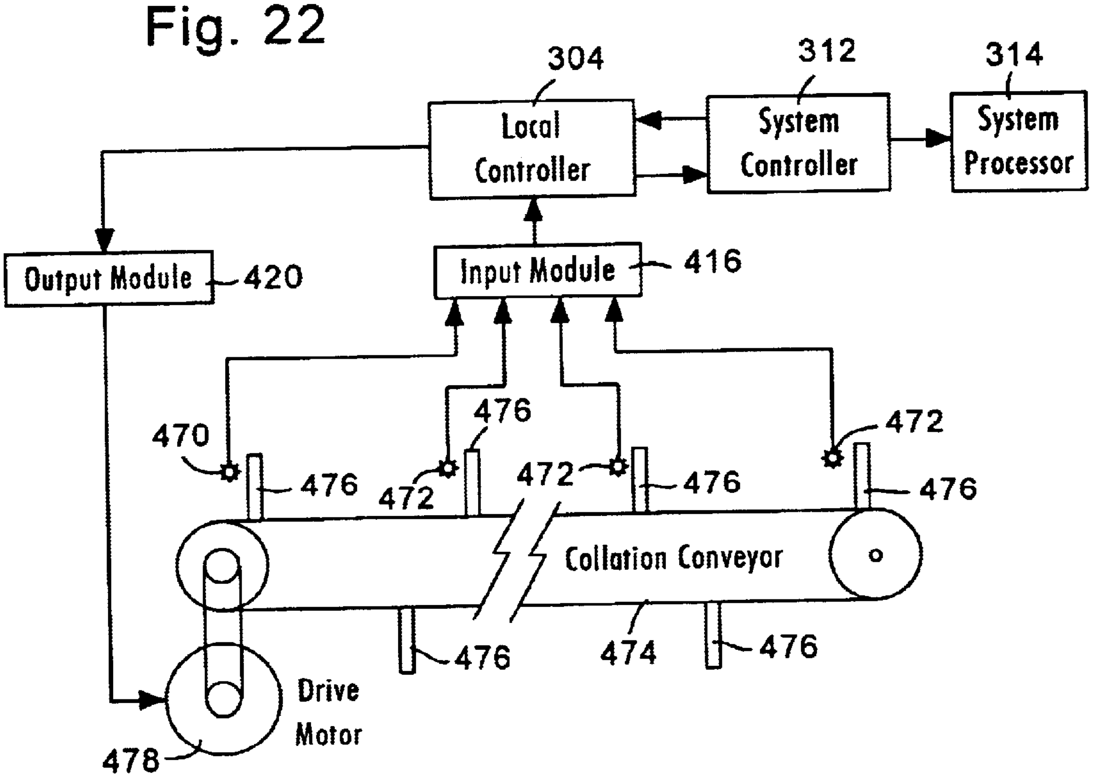

FIG. 10 is a detail front perspective view of the document suction picker assembly of the present invention and a partial front perspective view of the gripper assembly of the present invention extending outwardly from a slot in the suction picker assembly;

FIG. 11 is a detail side elevation view of the extended and home positions of the gripper assembly and air cylinder mount of the present invention with the gripper jaw shown in its open position and, in phantom, in its closed position; taken along the line 11—11 in FIG. 10;

FIG. 12 is detail partial side view of the flats bundle collator of the present invention showing the relative location of the buffer platform and for the reject gate;

FIG. 13 is an end partial perspective view of the system of feed stations of the present invention, taken generally along line 13—13 of FIG. 1;

FIGS. 14A through 14F are side elevation schematic drawings showing the sequence of operation of the buffer platform and reject gate of the present invention;

FIG. 15 is a block diagram of the control system for the flats bundle collator of the present invention;

FIG. 16 is a flowchart illustrating the overall operation of one embodiment of the present invention;

FIG. 17 illustrates the overall system architecture for the system processor 20 of the present invention;

FIG. 18 illustrates the functioning of the infeed mail stack sensor of an embodiment of the present invention;

FIG. 19 illustrates the functioning of the picker assembly cylinder extend and retract sensors of the present invention;

FIG. 20 illustrates the functioning of the gripper jaw, gripper cylinder extend, gripper cylinder retract, and gripper jaw release sensors of the present invention;

FIG. 21 illustrates the functioning of the buffer platform cylinder extend and buffer platform retract sensors of the present invention; and FIG. 22 illustrates the flinctioning of the index or finger sensors and stack height sensors of the present invention.

DETAILED DESCRIPTION OF THE PREFERRED EMBODIMENT

While the invention is susceptible of embodiment in many different forms, there is shown in the drawings and will be described herein in detail a preferred embodiment of the invention. It should be understood however that the present disclosure is to be considered an exemplification of the principles of the invention and is not intended to limit the spirit and scope of the invention and/or claims of the embodiment illustrated.

Referring to FIG. 1, four read-feed modules of the flats bundle collator 10 constructed in accordance with the present invention is illustrated. Each read-feed module assembly 12 comprises two feed stations 14, 16 in side by side alignment.

The present invention contemplates any number of read-feed module assemblies 12 in a side by side array, depending upon the number of incoming stacks of mailpieces that are to be collated for a given mail route run. By way of example, it is presently contemplated that eight read-feed module assemblies 12, providing sixteen feed stations 14, 16 would be aligned in a typical flat mail processing facility.

As described below in more detail, each feed station 14, 16 is adapted to receive an incoming stack 17 of flat mailpiece documents 19 (FIG. 3), wherein each mailpiece document 19 in a given stack 17 is imprinted with a POSTNET eleven digit barcode defining a distinctive delivery point address, or other readable code or symbol, wherein each delivery point is a specific home, apartment, condominium, building, or the like, to which mail is to be delivered to a customer. Each delivery point address or barcode is readable electronically, such as by a barcode reader, closed couple device (CCD) camera, or other image capture or read device that is capable of transforming the address barcode or symbol into a digital or other image for processing by a data processing unit. In the illustrated embodiment of the barcode, the image of which is captured digitally, and processed by a data processing unit, as will be explained.

The present invention contemplates that each mailpiece document 19 in an incoming stack 17 of documents will be provided in a predetermined sequence, for example in an order corresponding to the delivery point sequence defined by the route used by a delivery person to deliver mail to each customer on the route.

Figure 2:
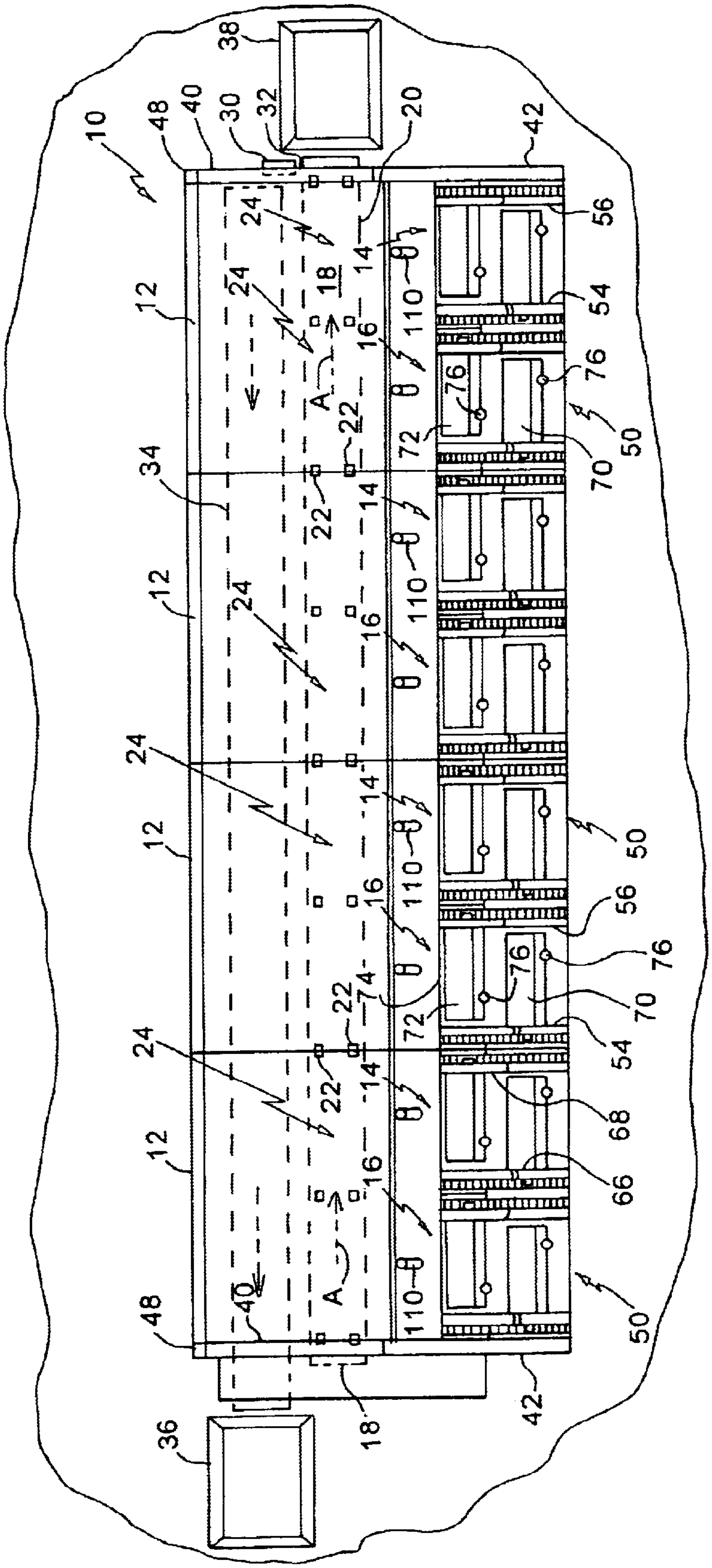
FIG. 2 is a top plan view of the multi-station flats bundle collator of FIG. 1.

In one embodiment of the present invention, as seen in FIGS. 1 and 2, a collation conveyor 18 comprising an endless belt 20 extends along the entire length of the plurality of feed stations 12. A plurality of fingers 22 are attached to and extend substantially perpendicular from the surface of belt 20 to form a plurality of pockets 24 on the belt 18 between adjacent fingers 22. Belt 18 extends around driven roller 26 and idler roller 28, and a motor 30 is operatively connected to the central shaft 32 of roller 26, whereby activation of motor 30 drives roller 28 and the upper run of belt 18 in the direction shown by arrow A in FIGS. 1 and 2.

As shown in FIG. 1, the flat bundle collator 10 may also include a reject conveyor 34 which deposits rejected mailpieces into a reject container 36, as will be explained. Collated groups of mailpieces, with each group to be delivered to a specific delivery point, are deposited from collation conveyor 18 into a tray 38, which is part of either a manual or automatic traying system or module (not shown, but disclosed in co-pending U.S. patent application entitled "Flats Mail Autotrayer System" filed concurrently herewith, and herein incorporated by reference), and which ensures that all collated groups of mailpieces are available, as groups, for delivery to the delivery point indicated on each mailpiece in a group.

Figure 3:
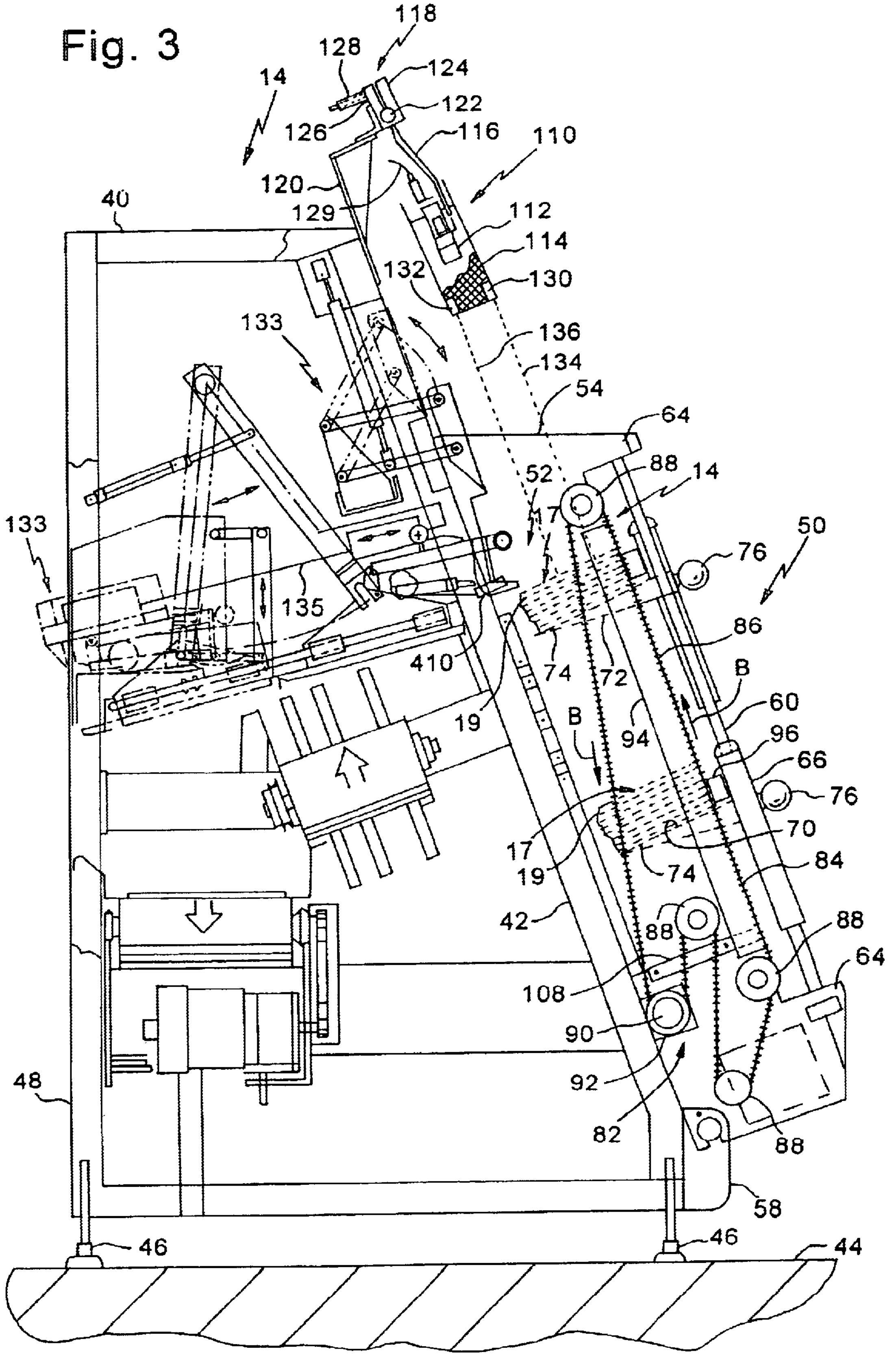
FIG. 3 is an end view of one of the feed stations comprising the flat bundle collator shown in FIG. 1, taken along the line 3—3 in FIG. 1.

FIG. 3 is a cut-away side schematic illustration of one of the read-feed modules 12 illustrated in a sequential array in FIGS. 1 and 2. The mechanical and electronic components of each read-feed module, to be explained in further detail, are mounted on a frame 40, having a slanted forward facing frame member 42. The frame 40 is mounted on a floor 44 or other supporting surface by means of adjustable levelers 46. Frame 40 also comprises a rear vertically extending frame member 48 to which components of the present invention are mounted, as will be explained.

An infeed magazine assembly 50 is mounted on forward facing frame member 42, which supports stack 17 of mail-pieces 19 (FIGS. 3, 4A, 4B, 4C) which are fed facing upwards towards a mailpiece feed position/station 52, where the delivery point barcode, or other code applied to the topmost mailpieces in each stack 17 are sequentially imaged and then removed from the stack of mailpieces for collation or rejection. In the illustrated embodiment, the term “imaged” means electronically obtaining an image of the POSTNET barcode (or other code) on each mailpiece, where the electronic image is processed further, as will be explained.

Referring to FIGS. 3 and 4, a pair of spaced apart side mounting plates 54, 56 extend vertically along and are fixed to the slanted frame member 42. A bottom bracket 58 (FIG. 3) mounted to frame 40 is also fixed to side mounting plates 54, 56 for additional vertical support. For each feed station 14, a pair of guide shafts 60, 62 are mounted vertically on side mounting plates 54, 56 by brackets 64, or other known means. A cylinder 66, 68 is slidably and rotatably mounted on each guide shaft 60, 62 respectively. A mail stack support paddle 70, 72 is rigidly fixed to respective cylinders 66, 68, for vertical movement of paddles 70, 72 along guide shafts 60, 62, respectively, and for horizontal pivotal movement of each paddle about its respective guide shaft. Each paddle 70, 72 has a relatively pointed forward end 74 (FIG. 3), and a knob or handle 76 on the rear end of each paddle.

A pair of jointly moveable mailpiece stack centering guides 78 (FIG. 6) are mounted on a panel plate 79 attached to side plates 54, 56, and include outwardly extending flanges 80. As each stack 17 of mailpieces 19 are advanced upward along slanted frame member 42 as will be explained, the forward edges of the mailpieces are engaged by flanges 80 to maintain the alignment of the mailpieces as they approach upwardly advance and feed station 52. Guides 78 are mounted on mounts (not shown) on the opposite side of plate 79 which extends between side mounting plates 54 and 56. Guides 78 move laterally along slots 81 until the distance between opposing flanges 80 is equal to the lateral dimension of the stack 17 of documents 19 on support paddles 70 and 72.

A belt drive assembly 82 (FIGS. 3, 4) is mounted on the outer sides of each side mounting plate 54, 56 to drive mailpiece support paddles 70, 72, respectively, vertically upwards towards feed position/station 52. Belt drive assembly 82 comprises a belt 84 which incorporates ridges 86 (FIGS. 3, 4, 5) on the outer surface of the belt, such as a timing belt. As seen in FIGS. 3 and 4, the belt 84 extends around a plurality of idler rollers 88, and around a drive roller 90 mechanically connected to a controllable motor 92. Motor 92 drives belt 84 in the direction indicated by arrow B in FIG. 3. Beneath the forward facing run of belt 84 is an elongated backing block 94 (FIGS. 3, 4), and the underside of belt 84 runs along the forward face of backing block 94.

As illustrated in FIG. 5, each cylinder 66, 68 has a U-shaped bracket 96 affixed thereto, with a bolted pin 98 extending between the ends of the bracket. A pivotal latch 100 is mounted on pin 98 between the ends of the U-shaped bracket 96 for partial angular pivotal motion about the pin 98. The lower end of latch 100 includes a flange 102 extending from the latch 100 towards belt 84, which flange has a substantially pointed tip 103. A spring element (not shown) may be mounted on bracket 96 to urge latch 100 in a direction away from cylinder 66 and towards belt 84, such that pointed tip 103 engages a groove between adjacent ridges 86 of belt 84. As viewed in FIGS. 3 and 5, upon actuation of motor 92, belt 84 is driven upward in the direction B and is buttressed against backing block 94. Either the spring or the equilibrium balance position of latch 100 maintains contact between pointed tip 103 of flange 102 of latch 100, and one of the ridges 86 of belt 84. Cylinder 66 and support paddle 70 can then be driven upward by belt 84 and the associated ridge.

As seen in FIGS. 4 and 5, each support paddle 70 (and 72) comprises a forward facing plate 104 which is securely affixed to cylinder 66 (or 68), such that if cylinder 66 and 68 rotates horizontally about guide shafts 60, 62, respectively, plate 104 and the respective support paddle 70, 72 will also rotate with cylinder 66 or 68. In FIG. 5, the connection between plate 104 and cylinder 66 is shown as weld 106, however it is understood that any suitable means of fixation of plate 104 to cylinder 66 (or 68) is within the scope of the present invention. Additionally, as cylinder 66, 68 move vertically along guide shafts 60, 62, support paddles 70, 72, respectively, also move vertically with cylinders 66 or 68.

The relative movements of support paddles 70 and 72 are illustrated in FIGS. 4A, 4B and 4C. In this illustrative description, support paddle 72 is disposed above support paddle 70 (FIG. 3), and it is presumed that all of the documents 19 have been removed from paddle 72, as will be explained. By manually grasping knob 76 (FIG. 4A), upper support paddle 72 may be rotated outward (arrow C) as cylinder 68 rotates around guide shaft 62. Upon the counter clockwise rotation of support paddle 72, as seen in FIG. 4, pointed tip 103 of flange 102 becomes disengaged from between adjacent ridges 86, of belt 84 as the pointed tip 103 of the flange 102 slides laterally away from ridges 86, and cylinder 68 and support paddle 72 may be manually moved vertically up or down to a new position along guide shaft 62. A similar latch 100 and flange 102 assembly is operatively connected to cylinder 66 and support paddle 70. Thus, the description of the movements of cylinder 68 and support paddle 72 are equally applicable to describe the movements of cylinder 66 and associated support paddle 70.

As seen in FIG. 4A, support paddle 72 is rotated counterclockwise more than ninety degrees from the position shown in phantom in FIG. 4A, so that the pointed end 74 of paddle 72 is clear of the stack 17 of documents 19 that are lodged on lower support paddle 70 (FIG. 4C). By using knob or handle 76, cylinder 68 and paddle 72 are lowered as indicated by arrow D in FIG. 4B to a position where paddle 72 is beneath support paddle 70. As seen in FIGS. 4A and B, support paddle 70 has been loaded with a stack 17 of documents 19, which was disposed below the stack of documents on paddle 72 as paddle 72 was previously unloaded of its documents 19, one by one, as will be explained.

When empty support paddle 72 is substantially below loaded support paddle 70, paddle 72 is rotated clockwise, as indicated by arrow E in FIG. 4B, until support paddle is in the position shown in FIG. 4C. As support paddle 72 rotates into the position shown in FIG. 4C, the tip 103 of flange 102 (FIG. 5) moves laterally in between two adjacent ridges 86 of belt 84. As explained previously, by the use of a spring or other resilient member, or by the equilibrium balance position of latch 100, upward movement of belt 84 will cause tip 103 of flange 102 to be engaged by an adjacent ridge of belt 84, whereby bracket 96, plate 104 and support paddles 70 and 72 will be advanced upward by drive motor 92 and belt 84.

When support paddle 72 is re-located to its position as shown in FIG. 4C, and is operatively engaged through latch 100 to belt 84, the support paddle 72 is loaded with a stack 17 of documents 19 for upward movement and subsequent collating as will be explained. It is understood that each stack 17 of documents 19 placed on support paddles 70, 72 in a single feed station 14 or 16, for a single mail distribution run or carrier route, comprises similar documents 19 which differ only in that the POSTNET or other barcode or delivery point designation on each document is different, and these designations are in sequence accordance with the pre-established delivery route.

In one embodiment of the present invention, a stationary platform 108 may extend between side mounting plates 54, 56 at the lower end of frame 40 and facing towards the front of flats bundle collator 10. If desired, referring to FIGS. 4A and 4B, prior to moving support paddle 72 to its position shown in FIG. 4C, a stack 17 of documents 19 in sequential delivery point order may be placed on stationary platform 108. As support paddle 72 is rotated in the direction shown by arrow E (FIG. 4B), the pointed end 74 of support paddle 72 wedges between adjacent documents 19 on platform 108. Those documents 19 on paddle 72 will be advanced upward toward feed station 52, while those documents below paddle 72 will remain on platform 108. When additional documents 19 are placed on platform 108, care must be taken to place these documents beneath the documents remaining on platform 108 so that the delivery point sequence is maintained.

As will be explained, controllable motor 92, preferably drives belt 84 incrementally, as will be explained, in the direction shown by arrow B in FIG. 3. At a point adjacent to each mailpiece feed position/station 52 in each read-feed module 12, (FIG. 3), an infeed mail stack sensor 410 (FIGS. 1, 3, 6, 18) is disposed on a support wall 79 (FIG. 10), and is electronically connected to the control system for the infeed paddle drive motor 92 (FIG. 18). As will be explained in more detail, as each support paddle 70, 72 is driven upward by motor 92 and belt 84, the motor stops when sensor 410 detects the uppermost document 19 in its respective stack 17. At this point, the uppermost document 19 is in the proper position for further processing and collating.

As stated previously, a digital image of the POSTNET barcode, or other delivery point address or code, on the topmost document 19 in each stack 17 is captured and forwarded electronically for processing. The timing of such image capture is controlled by the feeder sequence. In the illustrated embodiment, and with reference to FIG. 3, the image capture device is a closed couple device (CCD) camera assembly 110 (FIG. 3). Camera assembly 110 comprises a CCD camera 112, such as XC-55 manufactured by Sony, disposed in a camera housing 114. Mounting shaft 116 extends between housing 114 and a universally pivotal ball-joint suspension assembly 118. Suspension assembly 118 is fixedly mounted to frame 40 by means of bracket 120. The ball joint portion of suspension assembly 118 comprises a ball 122 fixed to the upper portion of shaft 116, and a pair of adjustable plates 124, 126 having cavities therein to engage either lateral side of ball 122. A manually operable tension adjusting device 128 allows the gripping tension on ball 122 to be loosened while camera housing 114 and camera 112 are adjusted into any position.

As viewed in FIG. 3, the lower end of camera housing 114 includes a pair of lasers 130, 132, each of which emits a separate light beam 134, 136. The lasers 130, 132 are calibrated such that as each beam 134, 136 is cast upon the topmost document 19 in upper stack 17, the distance between each light beam is approximately two and one-half inches, which approximately corresponds to the lateral distance from one end to another end of the POSTNET barcode on each document 19. Since each documents 19 in a given mailing is prepared in the same format, the barcode will appear in the same approximate location and have the same orientation on each document in that mailing. Thus, the position of camera 112 manually does not have to be re-oriented during the processing of the documents 19 comprising that given mailing. When a stack of new documents 19 to be collated is introduced to a feed station 14, 16 of collator 10, the camera housing 114 is re-oriented to its proper position as described above. In this manner, camera 112 can be positioned to capture a delivery point barcode on a document 19 regardless of the position or orientation of the barcode on the document.

Figure 1A:
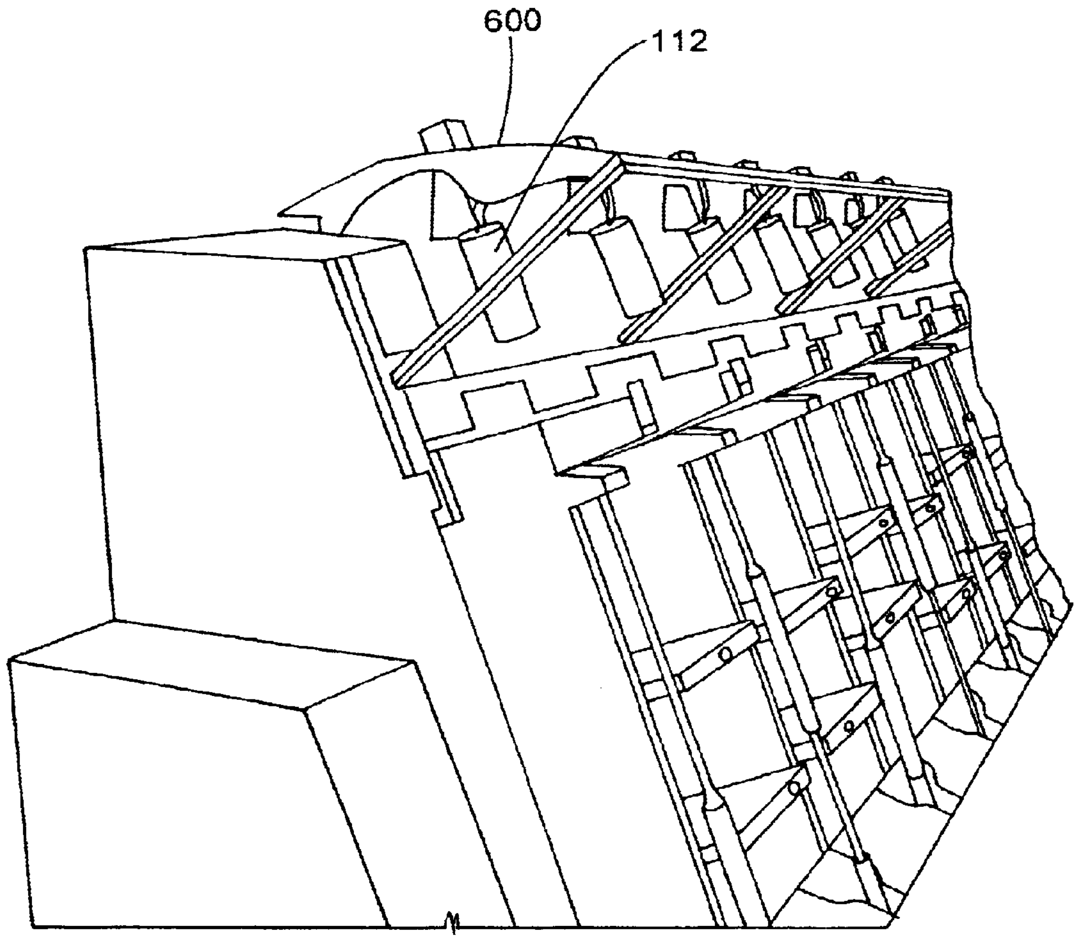
FIG. 1A is a perspective view of the flats bundle collator of the present invention.

Camera 112 captures a digital image of the address or delivery point barcode on each document 19, and transmits that information through electrical connection 129 to the data processor system illustrated and described in conjunction with FIGS. 16 and 17 herein. As seen in FIG. 1A, opposed lamps are used to illuminate the mailpiece evenly for optimal image capture, with each lamp illuminating an opposite one half of the mail piece. A lamp baffle is located proximate each lamp to prevent glare from one lamp on the portion of the mailpiece closest to that lamp, i.e., to prevent glare or "hot spots" on the portion of the mailpiece not being illuminated by that lamp. Further an overhead light shield 600 is provided to prevent glare from overhead lights.

Immediately after capture of the image of the barcode on the topmost document 19 of a stack 17, which document is positioned at mailpiece feed position/station 52, the topmost document 19 is automatically and individually removed from its respective stack and advanced for either collation or rejection. To sequentially remove each document 19 from its respective stack, a document picker assembly is provided, as shown in FIGS. 3 and 6. Picker arm assembly 133 comprises a moveable plate 135 (FIGS. 3, 6, 10) which has a pair of lateral flanges 137, 138 to which a plurality of suction picker assemblies 140 are mounted. A pair of fingers 141 are provided to impart a curl or bend in the mailpiece being picked up, to ensure that only the top mailpiece is picked up, i.e., due to the bend, if a lower mailpiece sticks to the mailpiece being picked up, the bend will cause the two mailpieces to separate.

Figure 10A:
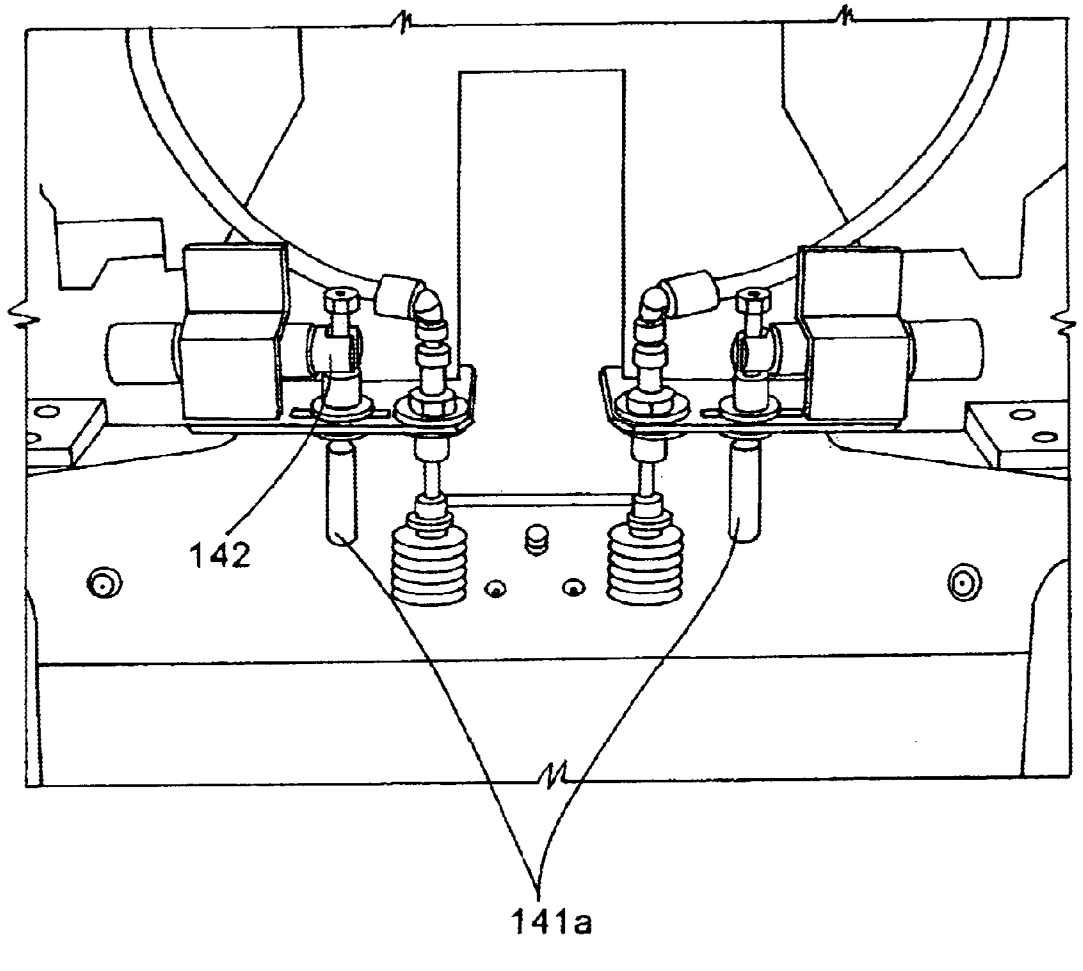
Figure 10B:
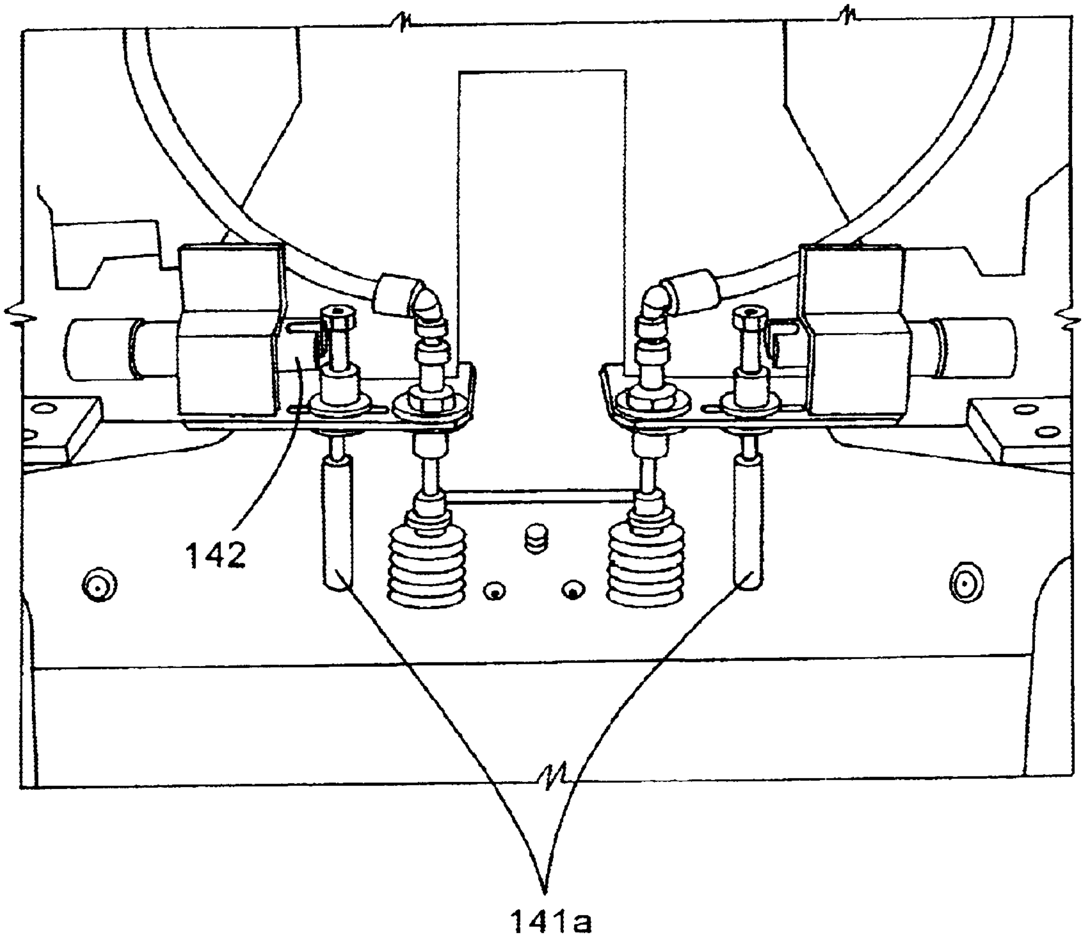

FIGS. 10A and 10B illustrate an alternate embodiment of the picker assemblies 140, wherein the fingers 141*a* are spring loaded so that they can be placed in two positions, an upper position as shown in FIG. 10A when engaged by a latch 142, and a lower position as shown in FIG. 10B when the latch 142 is retracted. The operator can select the different finger positions depending on the type of mailpieces being picked up.

FIG. 15 illustrates a block diagram of the overall control system 300 for the flats bundle collator 10. Each feed station 14, 16 is operably connected to its own local controller 304. As described previously, two individual feed stations 14, 16 for each read-feed module 12, and the present invention may comprise any number N of read-feed modules 12. Alternatively, each read-feed module 12 may comprise a single feed station, or more than two read stations. Generally, each feed station 14, 16 has multiple I/O modules 310 via which the feed stations 14, 16 communicate with the local controllers 304. In addition, the collation conveyer and autotrayer have their own I/O module 310 (FIG. 37).

The local controllers 304 are each connected to a high speed serial network which is connected to the system controller 312. The system controller 312 is then connected to the overall system processor 314 via a serial communication line. In general, the system controller 312 communicates with the system processor 314 to pass status information from the local controllers 304 to the system processor 314 and to pass machine control instructions from the system processor to the system controller 312. The local controllers 304 receive machine control information from the system controller 312, and based on this information, the local controllers 304 control the mechanical operation of their corresponding feed stations 14, 16. In addition to controlling the stations 14, 16, the local controllers 304 may also perform certain independent local processing without intervention of the system controller 312.

The system processor 314 may be a personal computer ("PC") with which a user (e.g., the operator) may interface for providing any necessary inputs to the system. This interface may be, for example, a graphical user interface ("GUI"). Via the user interface, the operator may input to the system processor 314 information including, for example, Sort Plan information, carrier route information, and/or other pertinent data for processing and/or collating the mail. The system processor 314 may also have the ability to collect statistical information relating to the flats bundle collator 10 operation, and to generate reports (e.g., end-of-day or end-of-run reports) based on this statistical information. The statistical information collected by the system processor 314 may include, for example, the number of errors or faults, the number of flats processed by each feed station 14, 16, the number of flats fed, the number of flats collated, the number of missorted flats, the number of flats without a barcode, or the total number of cycles administered.

FIG. 16 is a flowchart 320 illustrating the overall operation of one embodiment of the present invention. Before the machine begins operation, the operator generally carries out an initialization process 322. This initialization process may include loading the flats bundles in a feeder stack on the support paddle 70 (FIG. 1). The initialization process may also include providing sort plan information to the system processor 314 (FIG. 15). The sort plan information generally comprises information such as, for example, the particular sorting plan which the processor should follow, including the delivery route identification, and the delivery route sequence to be followed. As explained below, when the collation conveyor belt is advanced, a sequence number is assigned to the new collation pocket introduced at the first feed station.

The initialization process 322 may also include adjusting the image capture camera to properly alm at the bar code location of the present set of flats. One way to aim the image capture camera, as discussed previously, may be to use two laser pointers to align the image capture area with the barcode and center the barcode within the image capture area. In general, the delivery sequence barcodes used by the U.S. Postal Service are approximately 3 inches long. Thus, in order to allow a certain amount of error in the positioning of the barcode, the image capture area may be larger than three inches long (e.g., 4"×6").

After the machine is initialized, operation may begin by, for example, activating a "start" actuator or button 324. The present description of the operation will be with respect to one individual feed station 14, 16. However, it will be appreciated that each station 14, 16 follows the detailed operation simultaneously and independently. Upon starting the machine, visual and/or audio warning signals may be activated 326 indicating that the machine is about to start. First, all of the feeders are set to their home positions 328. Next, an image of the barcode of the piece of mail on the top of the stack of the top support paddle 72 is captured by the camera 112. This image capture step may be triggered by, for example, a "ready capture" message from the system controller 312 (FIG. 30) to the system processor 314. The "ready capture" message will indicate the particular feed station (or stations) 14, 16 that is (are) ready for image capture. The captured image is then processed and the barcode decoded 332 by the system processor 314 which generates a code number associated with the present piece of mail. This code number may be, for example, an eleven digit value representing the delivery point of the present piece of mail. However, for different applications of the present invention, the code value may vary. For example, for use in a smaller company's mail room, the code value may be a two-digit value identifying a particular department.

After the picker picks up the next piece of mail, the gripper grabs that piece of mail and pulls it onto the buffer platform 336. A new piece of mail is now on the top of the feeder stack, and thus the system processor 314 may capture the next barcode image 338. This may, again, be indicated by a "ready capture" message from the system controller 312 to the system processor 314.

At the same time that the next image is being captured and decoded, the system controller 312 may check for a fault at the feed station 14 or 16 (step 340). If a fault has occurred the machine stops 342. Various fault situations are described in further detail below. If a fault has not occurred, the system processor 314 checks the decoded barcode number corresponding to the present piece of mail on the buffer platform to determine whether the feed station 14, 16 should reject the piece of mail 344. A rejection may occur when, for example, the barcode is unreadable, the barcode is out of sequence, or a double feed has occurred. If any of these situations is present, the system processor sends a "reject" message to the system controller 312, and the system controller 312 instructs the local controller 304 to reject the piece of mail 346. The rejected mailpiece then is not dropped to the collation conveyor, but instead is moved by the buffer platform to a position over the reject conveyor, where it is then dropped onto and conveyed to the reject container. The reject conveyor is preferably driven in a direction opposite of the conveyor assembly. The system controller 314 then sends a "cycle complete" message to the system processor 312 (step 348), and then the next feeder cycle begins, picking up the next piece of mail on the feeder stack, and pulling the piece of mail onto the buffer platform 336.

If the current piece of mail on the buffer platform is not rejected, the system processor 314 determines whether the barcode for this piece of mail corresponds to the collation pocket currently positioned under the buffer platform 350. If there is a match, the system processor 314 instructs the system controller 312 to transfer the piece of mail, and the system controller 312 accordingly instructs the local controller 304 to transfer the piece of mail to the collation pocket 352. Based on a signal received from a "stack height" sensor 42 at each collation pocket, the feed station 14, 16 sends a signal to the system controller 312 if the collation pocket 24 is full 354. If the "stack height" sensor does not indicate a full pocket, the system controller 312 may check for any faults in the read-feed module 14, 16 (step 356). If there is a fault, the machine stops 358. If there are no faults, the system controller 312 sends a "cycle complete" message to the system processor 314 (step 360), and then the next feed cycle begins, starting with determining if the buffer platform is empty 334, picking up the next piece of mail on the feeder stack, and pulling it onto the buffer platform 336.

If the collation pocket is full after the current piece of mail is transferred to the pocket, the "full pocket" mode of operation is activated 362. In accordance with a preferred embodiment of the present invention, in the "full pocket" mode of operation, the system processor 314 may be set up such that the particular barcode number assigned to the full conveyor pocket will be reassigned to a new collation pocket. Thus, any future pieces of mail that would have been transferred to that conveyor pocket will now be transferred to the reassigned conveyor pocket. Alternatively, the system processor 314 may simply indicate that any future pieces of mail with the barcode number assigned to the full pocket will be rejected.

If the system processor 314 determines there is no match between the barcode for the current piece of mail and the conveyor pocket positioned below the buffer platform, the piece of mail is held on the buffer platform.

Once the system processor 314 determines there are no matches at any of the feeder locations 350, the system controller 312 instructs the collation conveyor to index or advance one place forward 364. The sensor functions associated with this mechanical operation are described in detail below. When the collation conveyor advances, the autotrayer (not shown) is actuated 366. Also when the collation conveyor advances, a new collation pocket is introduced to the first feeder. This new collation pocket is assigned a corresponding sequence number 368. The system processor 314 again determines if there are any matches between the barcodes of the current pieces of mail on the buffer platforms, and the new collation conveyor pockets respectively beneath them (step 370), and the process described above with respect to whether to transfer the flat to the collation conveyor pocket (steps 352–362) or wait and then advance the collation conveyor belt (steps 364–370) repeats.

For purposes of simplicity, the present detailed description describing the flowchart of FIG. 16 identifies two places where the machine checks for faults (steps 340 and 356). However, it will be appreciated that to one with skill in the art, it would be a simple task to check for faults at other stages of the process. For example, a fault-check may occur between steps 346 and 348, or between steps 352 and 354. In a preferred embodiment, a step of checking for faults would occur at any stage in the process where a fault may be likely to occur.

FIG. 17 illustrates the overall system software architecture 380 for the system processor 314. The system software 380 includes several software modules for implementing various operations. The Feeder Control Module 382 acts as the interface between the system controller 312 and the various other modules of the system processor 314. This is the only module that communicates with the system controller 312. For example, the Feeder Control Module 382 will receive commands from the Sort Plan Tracking Module 396 (described below) to initiate a new cycle. The Feeder Control Module 382 also provides messages from the system controller 312 to the Main Router Module 384 (described below) which will forward these messages to the appropriate module or modules on a first-in first-out ("FIFO") basis.

The Main Router Module 384 is responsible for routing all messages to and from the feed stations 14, 16 and the various other modules of the system software application 380. For example, when the Feeder Control Module 382 receives a "ready capture" message from a particular feed station 14, 16 via the system controller 312, the Feeder Control Module 382 sends the ready capture message to the Main Router Module 384 which stores it in a FIFO queue until the message is ready to be forwarded to the Image Capture Module 386. Generally, a "ready capture" message for a particular station 14, 16 is sent by the system controller 312 to the Feeder Control Module 382 when that station 14, 16 is ready for image capture.

The Image Capture Module 386 receives the "ready capture" message from the particular feed station 14, 16, and then executes an image capture algorithm for the appropriate camera. Generally, this image capture algorithm includes instructing a frame grabber 388 to activate the appropriate camera and "grab" or capture the corresponding image. In a preferred embodiment of the present invention, there are three frame grabbers 388, each of which is assigned to one or more feeder cameras. In general, the frame grabbers 388 can only grab one image at any given time, so the Image Capture Module 386 may include a FIFO buffer to chronologically store "ready capture" messages until they are ready to be executed. Once the image is captured, the Image Capture Module 386 sends a "capture complete" message to the Image Process Module 390 (via the Main Router Module 384), and stores the digital image data to an Image Buffer Manager to wait to be processed.

The Image Process Module 390 processes and decodes the captured image, and outputs a multi-digit code corresponding to the bar code on the piece of mail. The bar code is stored in a Code Buffer 394 while an "image decoded" message is sent to the Sort Plan Tracking Module 396 via the Main Router Module 384. In one embodiment of the present invention, the Image Process Module 390 may only be able to process one image at a time. In such an embodiment, the Image Process Module 390 may have a FIFO queue in which to store the incoming "capture complete" messages while an image is being processed and decoded.

The Sort Plan Tracking Module 396 is responsible for storing the sort plans in memory, tracking the collation pockets on the collation conveyor belt, and tracking the delivery points of mail from the feed stations 14, 16. In a preferred embodiment, the Sort Plan Tracking Module 396 is able to keep track of two delivery points for each station 14, 16. The first delivery point is that of the mail piece on the buffer platform waiting to be dropped, and the second delivery point is that of the mail piece on top of the stack on the feeder platform. The Sort Plan Tracking Module 396 processes all of the delivery points associated with mail-pieces processed and assigns each collation pocket to one of these delivery points. In a preferred embodiment, the Sort Plan Tracking Module 396 may be able to assign more than one collation pocket to a single delivery point. Where there are multiple collation pockets for a given delivery point, mail pieces destined for that delivery point will fill the lead pocket first, and then cascade into subsequent pockets as needed. If more mail is present with a particular delivery point than the pocket or pockets assigned to that delivery point can handle, the overflow mail may be rejected. Similarly, if a mail piece's delivery point barcode value could not be read by the system processor 314, it may also be rejected. Also in a preferred embodiment, the mail stacks loaded onto the support paddles 70, 72 of each station 14, 16 will be in sequential order.

As explained above, when the Image Process Module 390 finishes decoding the digital image from an image capture event, it sends an "image decoded" message to the Sort Plan Tracking Module 396. This "image decoded" message identifies the location in the Code Buffer 394 where the output code is stored, as well as the feed station 14, 16 with which the "image decoded" message is associated. Based on the appropriate output code from the Code Buffer 394, information from the "image decoded" message, and the location of the collation pocket corresponding to the delivery point of that bar code, the Sort Plan Tracking Module 396 determines whether the mailpieces should remain on the buffer platform, fall into the collation pocket directly beneath the buffer platform, or be rejected. This determination results in a "hold-accept-reject" message from the Sort Plan Tracking Module 396. The "hold-accept-reject" message is then sent to the Feeder Control Module 382 via the Main Router Module 384, and then to the system controller 312.

The Statistics Logging Module 398 tracks and stores all statistics generated by the system processor 314. The other modules will send messages to the Statistics Logging Module 398 as needed and as generated. Table 1 below illustrates the possible statistics that may be logged by the Statistics Logging Module 398, including the source module from which the statistics are received.

TABLE 1

| STATISTIC | DESCRIPTION | SOURCE MODULE |
|---|---|---|
| Cycle Count | The number of complete feed cycles for the system. | Feeder Control Module |
| Mail Pieces Fed | Number of mail pieces fed into the system. | Feeder Control Module |
| Mail Pieces Rejected | The number of mail pieces rejected by the system for any reasons. | Sort Plan Tracking Module |
| Images Captured | The number of images captured by the system for all feed stations. | Image Capture Module |
| Images Processed | The number of images successfully processed by the Image Processing Module | Image Processing Module |
| Barcodes Resolved | The number of images that were successfully decoded. | Image Processing Module |
| No Barcode Found | The number of images where the decoder was unable to locate a barcode. | Image Processing Module |
| Invalid Barcode | The number of barcodes that were not within the sort plan. | Image Processing Module |
| Overflow Pockets | The number of pockets that were filled to capacity. | Sort Plan Tracking Module |

The above statistics are only examples and the invention is not limited to these statistics. The Graphical User Interface ("GUI") Module 400 is responsible for all user interfacing with the system processor 314. User inputs may be provided to the GUI Module 400 via, for example, a keyboard or touch screen monitor or mouse. These user inputs may include, but are not limited to, the particular sort plan or plans to be applied, the particular carrier route or routes being processed, print commands, and other control commands. The print commands may include, for example, a command to print an end-of-run report or end-of-day report of statistics generated by the Statistics Logging Module 398.

Finally, the present invention may comprise a separate Test Module 402, for testing various operations of the machine. The Test Module 402 may be used to carry out various desirable tests of the machine, either from time to time or routinely. The Test Module 402 sends and receives signals and messages between the GUI Module 400 and the system controller 312 (via the Feeder Control Module 382). For example, the user-operator may want to test the infeed paddle drive motor of feeder number "N" to determine if it is working properly. The user-operator would send an instruction via the GUI Module 400 to the Test Module 402 indicating that a test of feeder N's infeed paddle drive motor is desired. The Test Module 402 would then so instruct the system controller 312 which would instruct the corresponding local controller 304 to run the predetermined test routine.

As explained above, in a preferred embodiment of the present invention, each feed station 14, 16 has its own local controller 304 with a series of inputs and outputs (I/O Modules 310), and the individual local controllers 304 are connected to a main system controller 312 which generally controls the overall system. The local controllers 304 in the embodiment described herein are generally "unintelligent" logic controllers with little to no processing or programming capabilities. These local controllers 304 generally send most or all of the input signals they receive to an external processor (i.e., the system controller 312) which processes those signals and in turn sends specific instructions to the individual local controllers 304. However, the present invention may alternatively use "intelligent" local controllers which may process some or all of the input signals on their own, without having to send them out to an external controller.

As explained above, there are numerous sensors used by the present invention. Many of these sensors may be used to detect fault conditions which may require stopping a particular feed station 14, 16, or the entire machine. In the present embodiment, upon sensing a particular condition, the sensors generally send a sensor signal to an input module of the corresponding local controller 304. The local controller 304 then forwards that sensor signal to the system controller 312 which processes the sensor signal and, based on the sensor signal, either sends an appropriate instruction to the local controller 304 (which then carries out the instruction), shuts down all or part of the machine, and/or sends an appropriate message to the system processor 314. If it is a fault that has been sensed, the system processor 314 may notify the user-operator (via the GUI Module 400) that a fault has occurred, and where in the system the fault occurred. In order for the system processor 314 to identify the exact fault condition that has occurred, and where it has occurred, the system processor 314 may store fault data variables corresponding to each type of fault for each feed station 14, 16 or read-feed module 12. Thus, when the fault occurs, the system controller 312 sends all the relevant information about the fault to the system processor 314 which processes this information and changes the appropriate fault data variable accordingly. Each sensor function and/or action will be described in further detail below with respect to FIGS. 33 through 37.

FIG. 18 illustrates the functioning of the Infeed Mail Stack sensor 410 of an embodiment of the present invention. The Infeed Mail Stack sensor 410 may be, for example, an infrared reflective sensor such as Honeywell No. HPX-H2-H, and it is located above the upper infeed support paddle 70. When the infeed paddle drive motor 92 is in motion, the infeed paddles 70, 72 (upper and lower) are being raised up toward the Infeed Mail Stack sensor 410. The Infeed Mail Stack sensor 410 detects when the mail on the upper infeed support paddle 72 has reached the level of the sensor (i.e., the Infeed Mail Stack sensor 410 becomes blocked by the top of the mail stack). Upon detecting the mail stack, the sensor sends a signal to the local controller 304 through an input module 416. The local controller 304 may then process this signal and instruct the infeed support paddle drive motor 92 to stop raising the infeed support paddles any further.

The Infeed Mail Stack sensor 410 may also indicate a fault condition. For example, when the infeed support paddle drive motor 92 is turned on, and the Infeed Mail Stack sensor 410 is not triggered (i.e., it does not become blocked) within a predetermined period of time, all or part of the machine is stopped, and the operator is alerted. In such a fault situation, the system controller 312 may shut down the entire machine or alternatively, it may shut down only the particular read-feed module 12 or individual feed station 14, 16 in which the fault is detected, so that the problem may be resolved. Upon detecting a fault condition, the system controller 312 may send a message to the system processor 314 indicating which module 14, 16 or feed station 12 caused the stoppage, so that the system processor 314 may notify the operator of the location of the fault.

FIG. 19 illustrates the functioning of the Picker Cylinder Extend and Retract sensors 430, 432. These sensors may be, for example, Hall-effect sensors such as Bimba No. HSCQC-04, and are located near the bottom and top of the picker cylinder 434, respectively. The Picker Cylinder Extend sensor 430 may be used to determine whether the picker 436 is fully extended. Similarly, the Picker Cylinder Retract sensor 432 may be used to determine whether the picker 436 is fully retracted. In a particular embodiment, it may be desirable to fully retract the cylinder 434 in order to get the picker out of the way of the camera when, for example, full image capture is desired.

When the picker 436 is fully extended, the Picker Cylinder Extend sensor 430 will normally send a signal to the system controller 312 via the corresponding local controller 304 indicating that the picker 436 is fully extended. The system controller 312 processes this "fully extended" signal, which indicates that the picker 436 is now in contact with the next piece of mail on the infeed stack, and the cycle may go on to the next step (i.e., the picker may pick up the piece of mail).

The Picker Cylinder Extend sensor 430 may also be used to indicate a fault situation. For example, when the picker cylinder does not lower completely and thus the Picker Cylinder Extend sensor 430 is not triggered within a predetermined amount of time, the system controller 312 never sends a "cycle complete" message to the system processor 314. If the system processor 314 does not receive the "cycle complete" message, the system processor 314 may instruct the system controller 312 to shut down the entire machine or alternatively, it may shut down only the faulty feed station 14, 16 until the problem is resolved. In a preferred embodiment, the operator is alerted that a fault has occurred, as well as to the particular feed station 14, 16 in which the fault has occurred.

The Picker Cylinder Retract sensor 432 operates in a similar fashion, but senses when the picker cylinder 434 is fully retracted rather than fully extended. In addition, the Picker Cylinder Retract sensor 432 may also be used in a fault situation such as, for example, where the picker__ does not raise completely. In one embodiment of the present invention, the Picker Cylinder Retract sensor 432 may not be used at all.

FIG. 20 illustrates the functioning of the Gripper Cylinder Extend, Gripper Cylinder Retract, and Gripper Jaw Release sensors 442, 444, 446, respectively.

A Gripper Jaw sensor 440 may be, for example, an infrared reflective sensor such as SUNX No. EX-14A-PN, and is located on the bottom portion of the gripper jaw 448. The Gripper Jaw sensor 440 may be used to determine whether there has been a mail misfeed. A misfeed is sensed when the gripper jaw 448 fails to grip a piece of mail that was (or was supposed to be) picked up by the picker 436. Under normal operating conditions, the Gripper Jaw sensor 440 senses a piece of mail between the gripperjaws 448, and sends a "mail sensed" signal to the system controller 312 via the local controller 304.

FIG. 9A illustrates an alternate sensor 440*a* which can replace the gripper jaw sensor 440 and its function. Sensor 440*a* is mounted above the buffer platform, and cooperates with a reflector 440*b* on the buffer platform, such that when a mailpiece enters between the sensor 440*a* and the reflector 440*b*, the sensor trips, resulting in the "mail sensed" signal to be sent to the system controller.

In one embodiment of the present invention, there may be an index logic unit in the system controller 312 which counts the number of misfeeds in a given cycle, and when the number of misfeeds exceeds a predetermined maximum value, the system controller 312 shuts down the machine (or the particular feed station 14, 16) and alerts the operator of the fault (including the station 14, 16 that caused the fault). In such an embodiment, the fault does not occur until after the number of misfeeds exceeds the predetermined maximum number.

The Gripper Jaw Release sensor 446 may be, for example, an infrared emitter/receiver sensor such as Honeywell No. HPJ-E21-008/HPJ-R22-001, and is located at the point along the gripper cylinder where the mail pieces are released (e.g., somewhere along the length of gripper cylinder). The Gripper Jaw Release sensor 446 is triggered when the gripper jaw is positioned below the Gripper Jaw Release sensor 446. When the gripper jaw 448 is so positioned, the Gripper Jaw Release sensor 446 sends a signal to the local controller 304 via an input module 416 indicating that the gripper jaw 448 is in the "release" position. The local controller 304 then processes this signal and instructs the gripper jaw 448 to release the mail. The gripper jaw preferably includes a flexible, resilient high friction material on its edges to prevent slipping of the mailpieces.

The Gripper Cylinder Extend and Retract sensors 442, 444 may both be, for example, Hall-effect sensors such as Tolomatic No. SWBC406TU. These sensors function in an identical manner to the Picker Cylinder Extend and Retract Sensors 430, 432. Thus, when either of these sensors senses the proper position of the gripper jaw 448 (e.g., when the Gripper Cylinder Retract sensor 444 senses that the gripper jaw 448 is in the home position, or when the Gripper Cylinder Extend sensor 442 senses that the gripper jaw 448 is in the grip position), a signal may be sent to the system controller 312 via the local controller 304 and processed by the system controller 312 to generate an appropriate instruction or message. That instruction is then sent to and carried out by the local controller 304. Specifically, when either of these sensors is triggered, a signal is sent to the system controller 312 (via the local controller 304) that the next step in the cycle may take place. For example, the triggering of the Gripper Cylinder Extend sensor 442 indicates that the most recent piece of mail picked up by the picker may be gripped by the gripper. Similarly, when the gripper jaw 448 is in the "home" position, the Gripper Cylinder Retract sensor 444 is triggered indicating that the next image capture may take place.

These Gripper Cylinder sensors 442, 444 may also be used to detect a fault condition. For example, when the gripper jaw 448 does not reach either the home or the grip positions (detected by the Gripper Cylinder Retract and Extend Sensors, 444, 442, respectively), the "cycle complete" message is never sent to the system processor 314, the machine (or the particular feed station 14, 16) is stopped, and the operator is alerted.

FIG. 21 illustrates the functioning of the Buffer platform Cylinder Extend and Retract sensors 460, 462, respectively. These sensors 460, 462 may both be, for example, Hall-effect sensors such as Bimba No. HSCQC-04. These sensors function identical to the Picker Cylinder sensors 430, 432 and the Gripper Cylinder sensors 442, 444. Thus, when either of these sensors senses the proper position of the buffer platform (e.g., when the Buffer platform Cylinder Retract sensor 462 senses that the buffer platform is in the back position, or when the Buffer platform Cylinder Extend sensor 460 senses that the buffer tray is in the home position), a signal may be sent to the system controller 312 via the local controller 304 and processed by the system controller 312 to generate an appropriate instruction or message. That instruction is then sent to and carried out by the local controller 304. Specifically, when either of these sensors is triggered, a signal is sent to the system controller 312 (via the local controller 304) that the next step in the cycle may take place. For example, upon returning to the home position after being in the back position, the Buffer platform Cylinder Extend sensor 460 is triggered indicating that the next piece of mail may be picked up by the picker. Similarly, when the buffer tray is in the "back" position, the Buffer platform Cylinder Retract sensor 462 is triggered indicating that the buffer tray should be sent back to the home position.

These Buffer platform Cylinder sensors 460, 462 may also be used to detect a fault condition. For example, when the buffer platform does not reach the fully retracted (i.e., the back) position, the Buffer Cylinder Retract sensor 462 is not triggered, thus the "cycle complete" message is never sent to the system processor 314. The machine (or the particular feed station 14, 16) is stopped, and the operator is alerted. Similarly, when a buffer platform does not reach its "home" position and thus the Buffer Cylinder Extend sensor 460 is not triggered, the "cycle complete" message is never sent, so part or all of the machine is stopped. The operator is then notified of the particular feed station 14, 16 which caused the fault.

FIG. 22 illustrates the functioning of the Index (or Finger) sensor 470 and the Stack Height sensors 472 (one for each conveyer collation pocket 24). These sensors may all be, for example, infrared emitter/receiver sensors such as Honeywell No. HPJ-E21-008/HPJ-R22-001. The Index sensor 470 is located at the end of the collation conveyor belt 20, and detects when the collation conveyor belt 20 has completed one pocket advancement. Specifically, it detects when the next collation pocket finger 22 reaches the Index sensor 470. When the Index Sensor 470 detects that one pocket advancement is complete, a signal is sent to the local controller 304 via an input module 416, and the local controller 304 processes the signal and instructs the drive motor 478 to stop advancing the collation conveyer 18.

Similar to the other sensors discussed above, the Index sensor 470 may also be used to detect a fault condition. For example, if the next collation pocket finger 22 does not pass the Index sensor 470 after the conveyor drive motor 30 is turned on, the "cycle complete" message will not be sent to the system processor 314, the machine (or the particular feed station 14, 16) is stopped, and the operator is alerted.

The Stack Height sensors 472 are located near the top of the collation conveyer fingers 22 which separate the collation pockets 24. These sensors 472 detect when the stack of mail in a particular collation pocket 24 has reached a predetermined maximum height. When this predetermined maximum height is reached, a "full pocket" message is sent to the system controller 312 by the corresponding Stack Height sensor 472, and the system controller 312 sends that "full pocket" message to the system processor 314. The system processor 314 then uses the "full pocket" message to determine the "hold-accept-reject" message (explained above) associated with that collation pocket 24 so that any additional mail destined for the full pocket is rejected.

It should be understood that the embodiments herein described are merely illustrative of the principles of the present invention. Various modifications may be made by those skilled in the art without departing from the spirit or scope of the claims which follow. Other modifications or substitutions with equivalent elements are also contemplated.

What is claimed is:

1. An apparatus for depositing documents at a predetermined location on a moveable collation conveyor for distribution of said documents to a predetermined delivery point, each document imprinted with code designating a distinct delivery point, said documents delivered to said apparatus in a predetermined sequence, the apparatus comprising:

a) a moveable platform assembly adapted to support and advance a stack of said documents in said predetermined sequence towards a feed station;

b) a device disposed adjacent said feed station for electronically capturing an image of said delivery point code on each document as each document reaches said feed station;

c) a moveable buffer platform located adjacent said feed station;

d) a document unloading assembly adjacent said feed station and adapted to remove the topmost document from the stack of documents and place the topmost document on the moveable buffer platform;

e) a data processing unit adapted to transmit information received from said captured image of said delivery point code to an actuation and actuated device controlling movement of said buffer platform, said data processing unit determining the presence or absence of a match between said delivery point code on the document on said buffer platform and a delivery point designation corresponding to said predetermined location on said collation conveyor;

f) said moveable buffer platform moveable from a first position substantially above said collation conveyor to a second position substantially above a reject station, said data processing unit controlling movement of said moveable buffer platform between said first and second positions of said buffer platform; and g) a document positioning device actuation and actuated in coordination with said moveable buffer platform and said data processing unit to deposit said document from said buffer platform to said collation conveyor in a first position of said document positioning device and said moveable buffer station, and to retain said document on said buffer platform in a second position of said document positioning device, when said buffer platform moves from said first position to said second position.

2. The apparatus of claim 1 wherein said data processing unit also determines at least one of (a) the presence or absence of a readable delivery point code on each document, and whether each document is or is not in said predetermined sequence.

3. The apparatus of claim 1 wherein said reject station is disposed adjacent said collation conveyor, and said moveable buffer platform is disposed substantially above said reject station when said buffer platform is in said second position of said buffer platform.

4. The apparatus of claim 1 wherein said document positioning device deposits said document from said buffer platform to said reject station when said document positioning device is in said first position and said buffer platform moves from said second position to said first position.

5. The apparatus of claim 1 wherein said moveable platform assembly includes a first moveable platform slidably and pivotally mounted on said apparatus for sliding movement to a plurality of substantially vertical positions adjacent said feed station, and for pivotal movement in a substantially horizontal direction at each of said vertical positions, said first moveable platform adapted to support a first stack of documents and advance said stack of documents to said feed station as said moveable first platform moves in a first vertical direction toward said feed station.

6. The apparatus of claim 5 wherein said moveable platform assembly includes a second moveable platform slidably and pivotally mounted on said apparatus for movement to a plurality of substantially vertical positions adjacent said feed station, and for pivotal movement in a substantially horizontal direction at each of said vertical positions, said second moveable platform adapted to support a second stack of said documents adjacent said first stack of documents.

7. The apparatus of claim 6 wherein each of said first and second moveable platforms is adapted to be pivotally removed from between and inserted between said first and second stacks of documents.

8. The apparatus of claim 6 wherein one of said moveable platforms is disposed between said first and second stack of documents, and the other of said moveable documents supports said second stack of documents adjacent said first stack of documents, said one moveable platform adapted for pivotal movement away from between said stacks of documents, wherein said other moveable platform supports both stacks of documents and said one moveable platform is moved to a position beneath said first and second stacks of documents, said one moveable platform adapted to support a third stack of documents adjacent said second stack of documents.

9. The apparatus of claim 5 wherein said first platform is slidably and rotatably mounted on a stationary shaft forming part of the apparatus, drive means adapted to engage said first platform to drive said first platform substantially vertically upward and to prevent said first platform from moving substantially vertically downward when said first platform is in engagement with said drive means, and to allow substantially vertical downward movement of said first platform when said first platform is moved out of engagement with said drive means.

10. The apparatus of claim 6 wherein said first and second platforms are slidably and rotatably mounted on respective stationary shafts forming part of the apparatus, first and second drive means adapted to engage said first and second platforms, respectively, and to drive said first and second platforms independently in a substantially upward direction and to prevent either of said first or second platforms from moving substantially vertically downward when said first and second platforms are m engagement with said drive means, each of said platforms rotatable out of engagement with said drive means to allow movement of said first and second platforms in a substantially vertical downward direction.

11. The apparatus of claim 1 wherein the device for capturing the image of the delivery point code is disposed above the feed station and is adjustable to capture an image of a delivery point code at any location on the topmost document of said stack of documents on said platform assembly.

12. The apparatus of claim 1 wherein the device for capturing the image of the delivery point code is a closed couple device camera that creates a digital image of the delivery point code on the topmost document in said stack, and transmits said digital image to said data processing unit.

13. The apparatus of claim 1 wherein said document unloading assembly includes a first document engaging device adapted to move from a first position where the first document engaging device engages the leading edge of the topmost document of the stack of documents to a second position where the first document engagement device, while engaging the leading edge of the topmost document, lifts the leading edge of the topmost document from the stack of documents.

14. The apparatus of claim 13 wherein said first document engaging device is mounted on a support plate, said support plate being pivotally mounted to move between a first lateral extended position and a second lateral retracted position on said apparatus adjacent said feeding station; said support plate moveable from said first lateral extended position to said second lateral retracted position after said image capture device has captured the delivery point code on the topmost of said documents in said stack.

15. The apparatus of claim 13 wherein said document unloading assembly includes a second document engaging device adapted in a first position to engage the leading edge of the document when the leading edge of the document is lifted, said second document engaging device moveable in a substantially horizontal direction to a second position where the engaged document is released and deposited on said buffer platform disposed substantially above said collation conveyor.

16. The apparatus of claim 15 wherein said second document engaging device comprises a stationary jaw member adapted to engage the underside of the lifted leading edge of said topmost document, and a moveable clamping member adapted to forcefully engage the topside of the topmost document and firmly hold the document between the stationary jaw member and the moveable clamping member as said second document engaging device moves said topmost document from said stack to said buffer platform.

17. The apparatus of claim 16 wherein said second document engaging device moves in a linear direction wherein said topmost document is moved from said stack to said buffer platform.

18. The apparatus of claim 14 wherein said first document engaging device includes a plurality of vacuum gripping devices operatively connected to a vacuum source, said plurality of vacuum gripping devices mounted on a mounting plate slidably attached to said support plate for vertical movement of said plurality of vacuum gripping devices relative to said support plate.

19. The apparatus of claim 18 including an actuating mechanism operatively connected to the data processing unit and to said slidable mounting plate to control the movement of said slidable mounting plate and said plurality of vacuum gripping devices.

20. The apparatus of claim 15 wherein the document positioning device includes a retractable stopping element adapted to move from a document engaging position to a retracted position, said retractable stopping element when in said document engaging position engaging said topmost document and retaining said topmost document on said buffer platform as said second document engaging device moves beyond said second position of said document engaging device, said second document engaging device releasing said topmost document onto said buffer platform when said second document engaging device moves beyond said second position of said document engaging device.

21. The apparatus of claim 20 wherein an upper surface of said buffer platform includes at least one groove extending in the direction of movement of said buffer platform; said retractable stopping element having at least one finger extending into said at least one groove when said retractable stopping element is in said document engaging position and said buffer platform is located substantially over said collation conveyor, said topmost document abutting said at least one finger and coming to rest on said buffer platform.

22. The apparatus of claim 21 including control means to move said buffer platform from said first position to said second position; said at least one finger of said retractable stopping element sliding in said at least one groove as said buffer platform moves to said second position and said retractable stopping element is in said document engaging position; said at least one finger abutting said topmost document and retaining the position of said topmost document as said buffer platform slides out from under the topmost document, said topmost document being deposited onto said collation conveyor when said buffer platform reaches said second position.

23. The apparatus of claim 21 including control means to move said buffer platform from said first position to said second position and back to said first position;

- means to move said retractable stopping element to a retracted position, removing said at least one finger from said at least one groove;
- said buffer platform moved from said first position to said second position by said control means with said retractable stopping element in said retracted position and said document remaining on said buffer platform;
- said retractable stopping element moved to said document engaging position when said buffer platform is in said second position;
- said document held in position by said retractable stopping element as said buffer platform moves from said second position back to said first position and out from under said document;
- said document being deposited upon said reject station when said buffer platform returns to said first position.

24. The apparatus of claim 22 wherein said control means is operatively connected to said data processing unit, said data processing unit generating a first signal indicating the presence of a match between said delivery point code on said document disposed on said buffer platform and a delivery point designation corresponding to said predetermined location on said collation conveyor, and said predetermined location on said collation conveyor is substantially beneath said buffer platform.

25. The apparatus of claim 22 wherein said data processing unit generates a signal indicating the absence of a match between said delivery point code on said document disposed on said buffer platform and a delivery point designation corresponding to the predetermined location on the collation conveyor substantially beneath said buffer platform, and said buffer platform remains in said first position supporting said document until said data processing unit detects said match.

26. The apparatus of claim 21 wherein said control means is adapted to move said buffer platform from said first position to said second position and back to said first position;

- a buffer control signal generated by said data processing unit, said buffer control signal transmitted to said means for moving said buffer platform and said retractable stopping element to move said retractable stopping element to its retracted position, removing said at least one finger from said at least one groove;
- said buffer control signal also initiating movement of said buffer platform from said first position to said second position of said buffer platform, said topmost document remaining supported by said buffer platform as said buffer platform moves to said second position;
- said retractable stopping element moving to said document engaging position when said buffer platform is in said second position, said at least one finger engaging a trailing edge of said document and holding said document in a stationary position as said buffer platform moves from said second position to said first position and moves out from under said document;
- said document being deposited on said reject conveyor when said buffer platform reaches said first position of said buffer platform.

27. The apparatus of claim 23 wherein said control means receives a second signal from said data processing unit indicating one of an unreadable delivery point code on said topmost document and a delivery point code which is in improper sequence, said control means, upon receipt of said second signal actuating said apparatus to:

(a) move said retractable stopping element to a retracted position;

(b) move said buffer platform from said first position to said second position;

(c) move said retractable stopping element to said document engaging position; and (d) moving said buffer platform from said second position to said first position, said buffer platform moving out from under said document.

28. An apparatus for collating documents disposed in a plurality of stacks, each stack including similar documents, each document in a stack imprinted with different address code designating a distinct delivery point, the documents in each stack being arranged in a predetermined sequence, said apparatus for collating documents comprising:

- a plurality of document collating stations;
- a movable collation conveyor extending along said plurality of collation stations, said collation conveyor including a plurality of pockets, each pocket designated by a distinct delivery point address;
- each said collation station including:
  - a) an advancing device adapted to advance a stack of documents towards a feeding station;
  - b) the feeding station including an image capture device to capture the image of the delivery point code on each document in the stack of documents as each document reaches the top of its respective stack, each said image being electronically stored in a data processing unit;
  - c) a movable buffer platform, movable from a first position adjacent said feeding station and above said collation conveyor to a second position over a document reject station, movement of said buffer platform under the control of said data processing unit;

d) a document unloading assembly engaging the topmost document in the stack of documents, and position said topmost document on said moveable buffer platform;

e) a document positioning device moveable between a first position and a second position, to correct the antecedent basis problem document engaging element adapted to engage the document on said buffer platform in said first position of said document engaging element and to deposit said document onto a pocket on said collation conveyor as said buffer platform moves from said first position to said second position of said buffer platform, said pocket having a distinct delivery point designation corresponding to the district delivery point code on said topmost document.

29. The apparatus of claim 28 wherein the document positioning device is further adapted to move to said second position and retain said document on said buffer platform when said buffer platform moves to the second position of said buffer platform; said document being placed over a reject station when said buffer station is in said second position of said buffer platform.

30. The apparatus of claim 29 wherein said document positioning device is adapted to move to said first position and engage said document on said buffer platform when said buffer platform is in said second position, and to deposit said document from said buffer platform to said reject conveyor when said buffer platform is moved to said first platform.

* * * * *